(12) United States Patent
Harris et al.

(10) Patent No.: US 8,708,358 B2
(45) Date of Patent: Apr. 29, 2014

(54) COMPACT STEERING MECHANISM

(75) Inventors: Brian Harris, Thief River Falls, MN (US); Robert Rauch, Thief River Falls, MN (US); John Seal, Thief River Falls, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 0 days.

(21) Appl. No.: 13/452,085

(22) Filed: Apr. 20, 2012

(65) Prior Publication Data

US 2013/0277935 A1    Oct. 24, 2013

(51) Int. Cl.
*B62D 3/12* (2006.01)

(52) U.S. Cl.
USPC .................................. 280/93.515; 280/93.514

(58) Field of Classification Search
USPC ......................................... 280/93.514, 93.515
See application file for complete search history.

(56) References Cited

U.S. PATENT DOCUMENTS

| | | | | |
|---|---|---|---|---|
| 3,298,708 | A * | 1/1967 | Cadiou | 280/93.515 |
| 3,572,459 | A * | 3/1971 | Nieminski | 180/425 |
| 6,543,568 | B2 * | 4/2003 | Cole | 180/428 |
| 8,201,656 | B2 * | 6/2012 | Archer et al. | 180/428 |
| 8,226,097 | B2 * | 7/2012 | Kudla et al. | 280/93.515 |
| 8,454,039 | B2 * | 6/2013 | Murakami | 280/93.515 |
| 2006/0169099 | A1 * | 8/2006 | Diez | 74/606 R |
| 2006/0272883 | A1 * | 12/2006 | Shin et al. | 180/428 |
| 2007/0216125 | A1 * | 9/2007 | Baxter | 280/93.514 |

* cited by examiner

*Primary Examiner* — Nicole Verley
(74) *Attorney, Agent, or Firm* — Lowe Graham Jones PLLC

(57) ABSTRACT

A compact steering mechanism for steering a vehicle having a steering input being a pinion shaft coupled to a pinion meshing with a rack, and a steering output member coupled to the rack. The pinion is positioned at a middle portion of the rack and the output member is positioned between opposing ends of a rack. The mechanism includes a compact steering housing supporting the pinion shaft and containing the rack-and-pinion. The pinion and pinion shaft have a center axis parallel to an axis of the output member. The output member, being a steering pin and rack carrier, a gear, or a flange, is coupled to left and right tie rod assemblies and wheels for steering the vehicle to improve handling.

41 Claims, 22 Drawing Sheets

COMPACT STEERING MECHANISM

FIELD OF THE INVENTION

The present invention relates generally to a rack-and-pinion steering device, and more particularly, to a compact steering mechanism with steering input and a steering output positioned between the ends of a rack for steering the vehicle and to improve handling.

BACKGROUND OF THE INVENTION

Rack-and-pinion steering devices typically employ a pinion that drives a rack with meshed gear teeth. The pinion provides the steering input. Links coupled at the ends of the rack provide the steering output. Typically the pinion is coupled to a steering shaft and steering wheel. The ends of the rack are coupled to right and left tie rod assemblies and wheels. This standard system relies on the ends of the rack for pushing and pulling the tie rods when the rack moves laterally by virtue of rotating the steering wheel, the steering shaft, and the pinion. In the standard steering system, the rack acts as a structural member; this may cause problems with adequate support and strength of the system, leading to fatigue or failure. It may also cause misalignment of the tie rods with the suspension system, creating inadvertent steering action during suspension travel.

Typical rack-and-pinion systems further create the problem of an undesirable angle of the tie rods coupled to the wheels because the tie rods are coupled at or beyond the ends of the rack. This can result in a steep angle of the tie rods as coupled to the wheel. This can also increase the stress on the components of the tie rod assemblies and on the steering system when turning or when driving over uneven surfaces. This undesirable angle may be the result of the steering output being coupled to the tie rods at a position relatively far away from the steering input and from the rack itself.

Another problem of the common rack-and-pinion systems concerns the amount of space required to achieve the results of the system described above. Providing a lengthy rack coupled to tie rods beyond the ends of the rack requires a steering system that can comprise much lateral space, leaving little space for tie rod assemblies with desirable configurations. It may also leave little room for suspension components. This poses problems for smaller vehicles and vehicles that require additional structural support members, such as recreational off-road vehicles.

Yet another concern relates to the undesirable angles that result from including a typical rack-and-pinion steering system described above. Providing tie rod couplings positioned outside of the ends of the rack does not well position the inboard ends of the tie rods at the same lateral position as the inboard ends of the front drive pivots, nor does it well position the outboard ends of the tie rods coupled to the wheels by half-shafts. This is also related to the relative position of the suspension arms, which are not aligned ideally with the tie rods. The result is an undesirable angle and configuration of the tie rods, half-shafts, and suspension arms that may further increase stress on the system and that can contribute to reduce handling. Center output steering assemblies exist in the market, but they also suffer from many of the disadvantages noted above. Even with center input and output steering mechanisms, present configurations are quite long and somewhat heavy as a result. This limits design packaging options, vehicle weight, and vehicle weight distribution. This is particularly of concern in side-by-side all-terrain vehicles where rack location is limited by the desired front suspension geometry and chassis width. In addition, it is desirable for the rack to remain protected within the chassis structure. With current steering assemblies, such configuration restrictions result in undesirable steering geometry.

The aforementioned problems with current rack-and-pinion systems typically result in the vehicle and driver experiencing bump-steer when driving on uneven surfaces or on off-road terrain. This can reduce handling while steering the vehicle and can pose risks of failure of the system or safety risks to the riders of the vehicle.

Therefore, a need exists for an improved steering device to obviate the aforementioned problems while providing an improved, light-weight center input and output steering mechanism with a shorter overall length. The present invention provides a compact steering mechanism for vehicles that provides a center rack input and an output member, coupled to a pair of tie rods, and positioned between the ends of the rack while overcoming the deficiencies of existing rack-and-pinion steering systems. The invention therefore provides a compact, light-weight rack-and-pinion steering assembly that has significantly shorter assembly length and weight.

SUMMARY OF THE INVENTION

Embodiments of the present invention provide apparatuses, systems, and methods for providing a compact steering mechanism for steering a vehicle. More particularly, the compact steering mechanism includes a steering housing including an internal cavity with a rack-and-pinion assembly contained therein. The pinion gear is coupled to a pinion shaft. Both the pinion shaft and the pinion have a common center axis. In a presently preferred embodiment, the pinion meshes at approximately the middle portion of the rack. The rack, having two opposing ends, includes an output member (the "output") coupled to the rack and positioned between the ends of the rack. The output member may have an axis substantially parallel to the center axis of the pinion shaft and pinion. The output member is coupled to a pair of tie rod assemblies and a pair of wheels of the vehicle for steering the vehicle. The mechanism therefore provides an input near the middle portion of the rack and an output positioned laterally between the ends of the rack. It will be appreciated that the pinion may be positioned at another portion of the rack and that the output member may be positioned along any portion of the rack. It is the spirit of the invention to provide an input and output disposed laterally between the ends of the rack to provide an improved compact steering device to reduce or eliminate bump-steer and to provide a geometrically-improved steering system.

In a first embodiment, the steering housing includes upper and front and back steering housings coupled by a plurality of fasteners and a having a gasket between the joining surfaces of the steering housings. The rack, the pinion, the output member, a rack plate, and a sealing plate are disposed in the internal cavity of the steering housing. A circular opening in the center portion of the back steering housing receives and supports the pinion shaft. In this first embodiment, the pinion shaft is coupled to the steering wheel of the vehicle. The opening includes a bearing disposed between the opening and the pinion shaft. The bearing may be a collar bearing for allowing the pinion shaft to freely rotate. The bearing or opening may include a seal for preventing debris from entering the internal cavity of the steering housing. The pinion shaft may include a collar on the opposite end from the pinion for coupling the steering shaft to the power steering unit and the steering wheel of the vehicle.

The rack has a lateral axis that is substantially perpendicular to the central axis of the pinion shaft. The rack therefore is movable in either lateral direction within the steering housing relative to the rotation of the pinion shaft by turning the steering wheel.

In this first preferred embodiment, the output member is a steering pin positioned in a center hole formed through the middle portion of the rack. The center hole and the steering pin have a center axis that is substantially parallel to the center axis of the pinion shaft. In an alternate configuration, the output member may be two steering pins positioned between the ends of the rack for coupling to tie rod assemblies.

The steering pin has a flange on its first end and a threaded bore on its second end. The flange is positioned into a slot in one horizontal side of the rack, such that the flange and the side of the rack are flush. The second end of the steering pin extends beyond the opposing horizontal side of the rack. The steering pin further extends through a hole in the rack plate and through slots in the sealing plate, and the back housing, thereby extending beyond the perimeter of the steering housing to receive a rack carrier. The slots are formed to allow the steering pin to freely move in either lateral direction of travel with the coupled rack as it moves within the steering housing.

The rack carrier is coupled to the steering pin and coupled to the pair of tie rods of the vehicle. The rack carrier is coupled to the steering pin by a steering pin fastener extending through a hole in the center of the rack carrier. The steering pin fastener is secured into the threaded bore of the steering pin to firmly secure the rack carrier to the rack. A pad may be coupled to the rack carrier and disposed between parallel surfaces of the rack carrier and the front steering housing to minimize friction or chatter.

The rack carrier includes two lateral and elongated holes each having a center axis substantially parallel to the lateral axis of the rack. The holes receive two support members for the rack carrier to slide along and for additional structural support. Guide seals and a guide bushing are secured to the lateral holes of the rack carrier to reduce friction and to guide the rack carrier along the support members. The guide seals are each secured to opposing ends of each hole and the guide bushings are secured inside the perimeter of the hole and between the opposing guide seals. A plurality of fasteners secure the support members to the steering housing and to a bracket through corresponding holes on each component. The bracket is secured to the chassis of the vehicle for firmly securing the compact steering housing to the chassis of the vehicle. The arrangement of the support members to absorb tie rod loads allows for a shorter steering pin coupled to the rack carrier and a steering pin with a smaller diameter, which further shortens the assembly and reduces weight while providing the necessary structural support for a steering mechanism of a vehicle. This contributes to ability of the compact steering mechanism to be used advantageously in a confined space and protected by surrounding chassis structure, all while reducing vehicle weight and contributing to the desired weight distribution.

The rack carrier includes two opposing holes on the lower portion of the rack carrier. Each hole is spatially positioned on either side of the steering pin and spatially positioned between the ends of the rack. The holes couple the rack carrier to the pair of tie rod assemblies. The holes are formed at an angle such that the center axis of the holes are horizontal and parallel to the surface of travel to provide a desired angle for coupling to tie rod assemblies. It will be appreciated that any suitable means of coupling and moving the tie rods can be incorporated into this first embodiment while maintaining the spirit of the invention of providing an output member with a take-off point disposed between the ends of the rack and coupled to tie rods assemblies at the take-off point.

The sealing plate and the rack plate are provided within the steering housing to prevent debris from entering the steering housing and to prevent fluid from entering or leaving the steering housing. The rack plate is engaged to a horizontal surface of the rack whereby the steering pin extends through the hole in the rack plate, as described above. The sealing plate has an oval slot in the center of the plate for allowing the steering pin to freely travel in its lateral direction as the rack moves. On a first surface of the sealing plate, a seal, comprised of a polymer material, is secured to the plate and positioned near the inside of the plate and the perimeter of the slot. The polymer seal on the first surface is slidably coupled to a surface of a sealing member coupled to the steering housing. The sealing member can be either the rack plate or the rack itself. The seal may comprise any suitable material for sealing the internal cavity. Similar to the seal on the first surface, on the opposing second surface of the sealing plate a second seal comprised of polymer material is secured in a similar fashion and positioned near the perimeter of the second surface of the sealing plate. The second surface of the sealing plate is slidably engaged to an interior surface of the front steering housing (the sealing plate may also be coupled to a plate or other suitable member coupled to the outside of the steering housing). The seals act as a seal between the rack plate and the first side of the sealing plate, and between the second side of the sealing plate and the front steering housing. The sealing plate thereby prevents debris from entering the internal cavity and prevents fluid from entering or leaving the internal cavity of the steering housing.

At least two aspects of the sealing plate configuration allow for a shorter, lighter steering mechanism. The first is the configuration of the polymer seals on both surfaces of the sealing plate. The second is that the horizontal length of the slot of the sealing plate is shorter than the horizontal length of the slot of the steering housing. Both aspects allow full travel of the rack and output member while providing a rack and pinion steering mechanism with a shorter overall length. Due to the overall shorter length, the compact steering mechanism is a less cumbersome and less heavy rack assembly that provides improved steering geometry.

In this first embodiment, guide members may be coupled to the ends of the rack by fasteners for guiding the rack as it moves laterally within the steering housing. The steering housing further includes an opening through the upper middle portion of the back steering housing for receiving a threaded plug, a spring, and an adjuster. The threaded plug is threaded into the opening. The spring is disposed between the threaded plug and the adjuster, and the adjuster is biased by the spring and pressed against the upper surface of the rack (the opposing surface from the teeth of the rack). The spring and adjuster therefore bias against the rack to provide smooth meshing of the rack and pinion teeth to reduce rack chatter and the likelihood of backlash. The steering housing may also include a valve for receiving or draining lubricating fluid into the internal cavity of the steering housing.

In a second embodiment, the output member is a first gear member coupled to the teeth of the rack. More specifically, teeth formed on a first end of the gear member mesh with the teeth of the rack near the middle portion of the rack. The first gear member includes a hole through its first end; the hole is coupled to a shaft secured to the steering housing to allow the first gear member to freely pivot about a center axis as the rack moves. A second end of the gear member has a hole coupled to the pair of tie rods of the vehicle.

The second embodiment may further include a second output member being a second gear member similar to the first gear member, whereby the gear members collectively comprise output points for coupling to tie rods for steering the vehicle. In this configuration, the teeth of the first gear member mesh with the teeth of the rack on one side of the pinion shaft and the teeth of the second gear member mesh with the teeth of the rack on the other side of the pinion shaft. It will be appreciated both gear members may be positioned on one side of the pinion shaft, or the gear members may be positioned in the center portion of the rack and the pinion shaft may be positioned nearer to an end of the rack.

The second ends of the gear members are coupled to corresponding left and right tie rod assemblies. It will be appreciated that other means of coupling the gear members to the tie rods are possible while still providing output points disposed within the ends of the rack. At least one stabilizing link may be coupled between the gear members. The ends of the link may be pivotally coupled between the first and second ends of each gear member. A lateral axis of the stabilizing link therefore maintains parallel to the lateral axis of the rack upon rotation of the gear members when steering the vehicle.

This second embodiment provides an input and a corresponding output positioned between the ends of the rack for steering the vehicle. One advantage is to reduce or eliminate bump-steer while driving and steering the vehicle because the length of the lever of the gear members may be equivalent to the lengths of the knuckle steering arms attached to the outboard ends of the tie rod assemblies, which provides a desirable angle and parallelogram of the steering system. It will be appreciated that many of the components described in the first embodiment may be incorporated into the second embodiment, such as the sealing and rack plate, bearings, rack guides, and other components described herein.

In a third embodiment, a combination of gears and shafts are coupled within or to the steering housing of the compact steering mechanism to provide a variable output lateral speed that is proportional to the input rotational speed for rapid steering or slow steering output response. More specifically, a first gear, having a center, is coupled to the pinion shaft at an off-center portion of the first gear and above the center of the first gear. Likewise, a second gear, having a center, is coupled to a steering shaft at an off-center portion of the second gear and above the center of the second gear. The teeth of the first gear mesh with the teeth of second gear. The center axis of the steering shaft is parallel to the center axis of the pinion shaft. In a preferred configuration, the first and second gears are unilobe, elliptical gears. This configuration also allows for minimal rack length and is particularly suited to 360 degree lock-to-lock configuration while maintaining a high reduction ratio well beyond either side of the 360 degrees.

The output member in this third embodiment is a flange secured to the middle portion of the rack on the opposite surface of the teeth of the rack. The flange includes two opposing holes positioned on either side of the pinion shaft. The holes are provided for coupling to the pair of tie rod assemblies of the vehicle. As with the output members described above in the first and second embodiments, the flange and holes are positioned between the ends of the rack and near the middle portion of the rack.

A rack guide may be coupled to the steering housing for guiding the rack as it moves laterally. The rack guide includes a hole through its center containing the pinion shaft and pinion and two bearings. Each bearing is coupled to the pinion shaft for allowing rotation of the pinion and pinion shaft. A rack mount may be secured below the rack guide and to the steering housing for additional structural support. The rack guide includes an elongated hole for receiving the steering shaft. In this third embodiment, the steering shaft is coupled to the power steering unit and steering wheel of the vehicle.

Due to the off-center coupling of the first gear to the pinion shaft and of the second gear to the steering shaft, when the steering wheel rotates in a desired direction and speed, the steering shaft causes rotation of the second gear as it rotates about an off-center axis. This rotation causes the first gear to rotate about a similar off-center axis of the first gear and the pinion shaft, which therefore causes rotation of the pinion. This rotation of the pinion thereby causes lateral movement of the rack and the output member in a speed and/or acceleration greater or less than the original input rotational speed and acceleration of the steering shaft/steering wheel. This configuration therefore provides variable output speed and acceleration relative to the input speed and acceleration for rapid steering response, such as when needed when racing vehicles or driving off-road at high speeds. This configuration also provides the advantage of the driver steering the vehicle without the need of releasing the steering wheel with either hand, which improves safety. For example, the output movement can be initially amplified for quick turning, whereas at the extremes of the wheel turn, the output movement of the rack is slowed.

Alternatively, the first and second gears can be secured to the steering shaft and pinion shaft as described above, but at off-center positions below the center of the gears. This inversed configuration provides the inverse of the variable output speed and acceleration described above to provide for initial slow steering response, such as when needed for climbing or rock-crawling while driving the vehicle. The response is accelerated at the extremes of the wheel turn.

In a presently preferred embodiment, the central axis of the pinion shaft is substantially within a central vertical plane of the chassis, wherein the compact steering mechanism is positioned approximately at the center forward position of the vehicle.

The few embodiments described above are merely examples of numerous embodiments that may exist around the present invention. It will be appreciated that the embodiments described above provide an additional advantage of a rack-and-pinion system that does not experience an internal change in pressure in the steering housing when displacing the rack, as the internal volume does not change during movement of the rack. This helps avoid pressure changes causing housing leakage or ingress of external fluids, such as water. It will also be appreciated that the embodiments described herein may include a variety of differing output members and configurations of output members while providing the output member disposed laterally between the ends of the rack and near, or in-line with, the center axis the pinion shaft to provide a centralized take-off point.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1A:
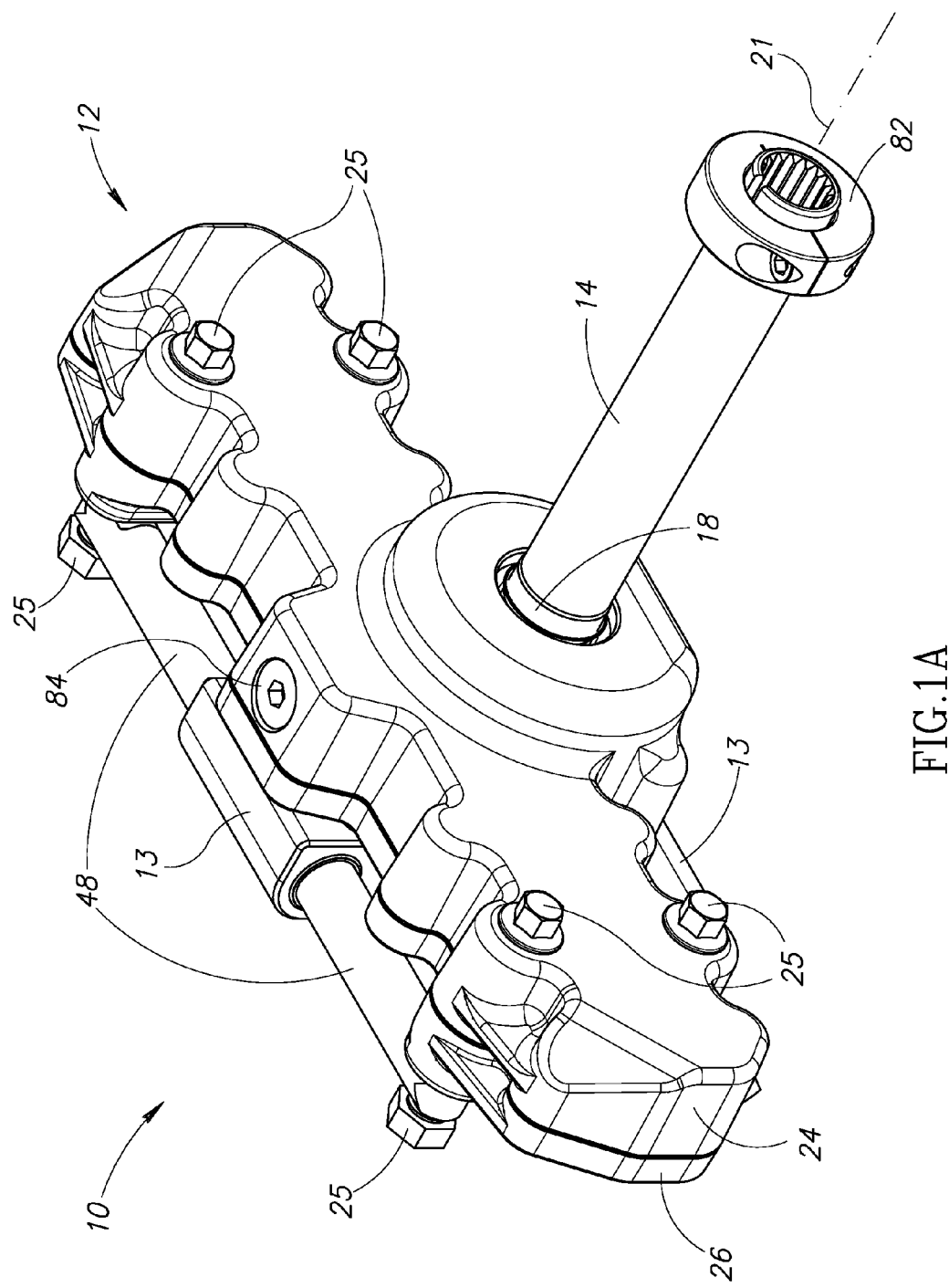
FIG. 1A is an isometric view of the compact steering mechanism in the first embodiment.
Figure 1B:
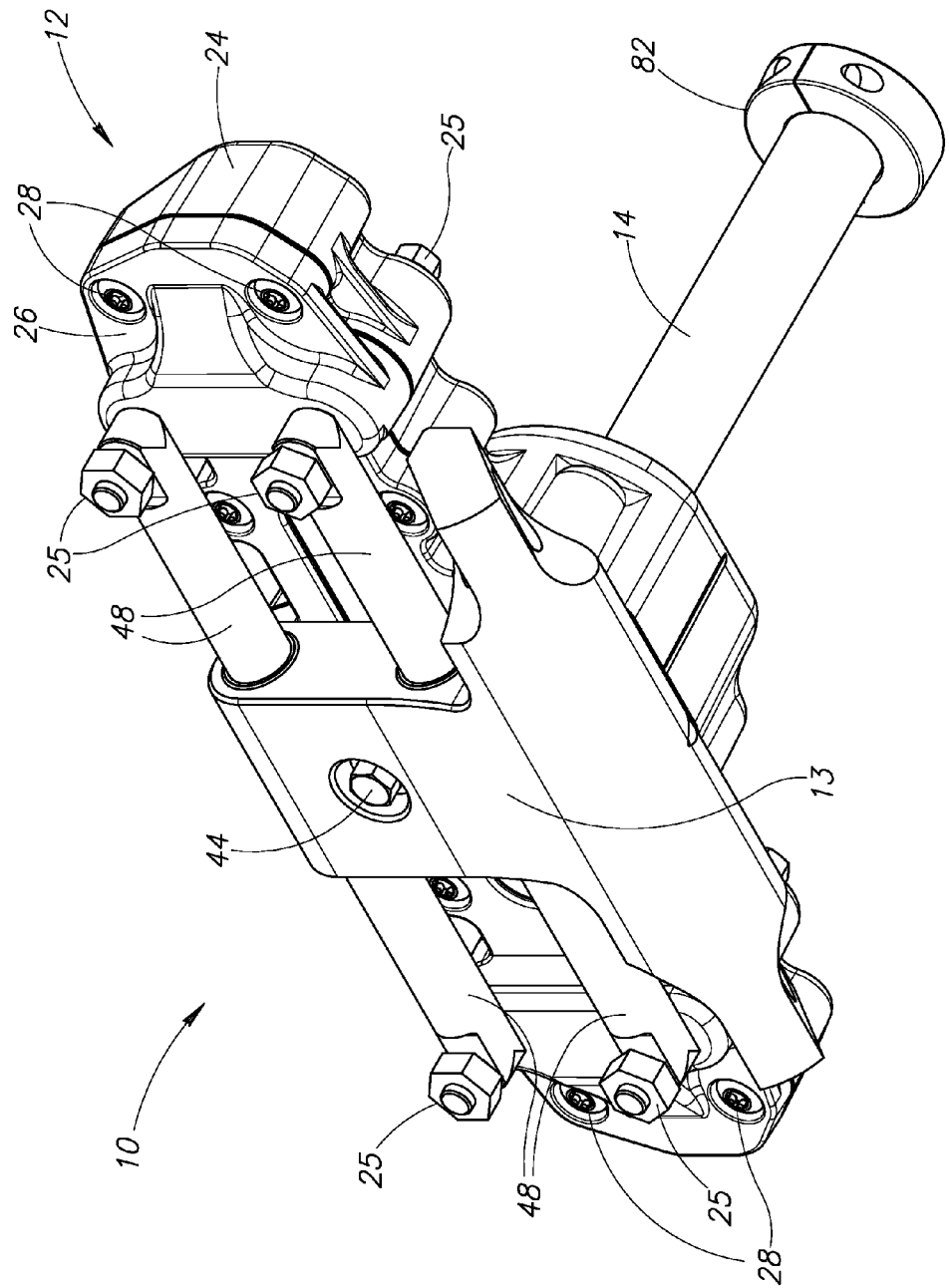
FIG. 1B is an isometric view of the compact steering mechanism in the first embodiment.

FIGS. 1A and 1B illustrate the compact steering mechanism 10 from rear and front isometric views, showing a steering housing 12 and a pinion shaft 14 disposed through an opening 18 of the steering housing. The steering housing includes a rear steering housing 24 and a front steering housing 26 coupled by fasteners 28. The pinion shaft 14 has a center axis 21 and includes a collar 82 to clamp the shaft to the power steering unit, which is coupled to the steering wheel of the vehicle (not shown). A rack carriage 13 is secured by steering pin fastener 44 to a steering pin and a rack (see FIGS. 4 and 6). Rack carrier 13 includes support shafts 48 extending on either side of lateral holes in rack carrier 13.

Figure 2A:
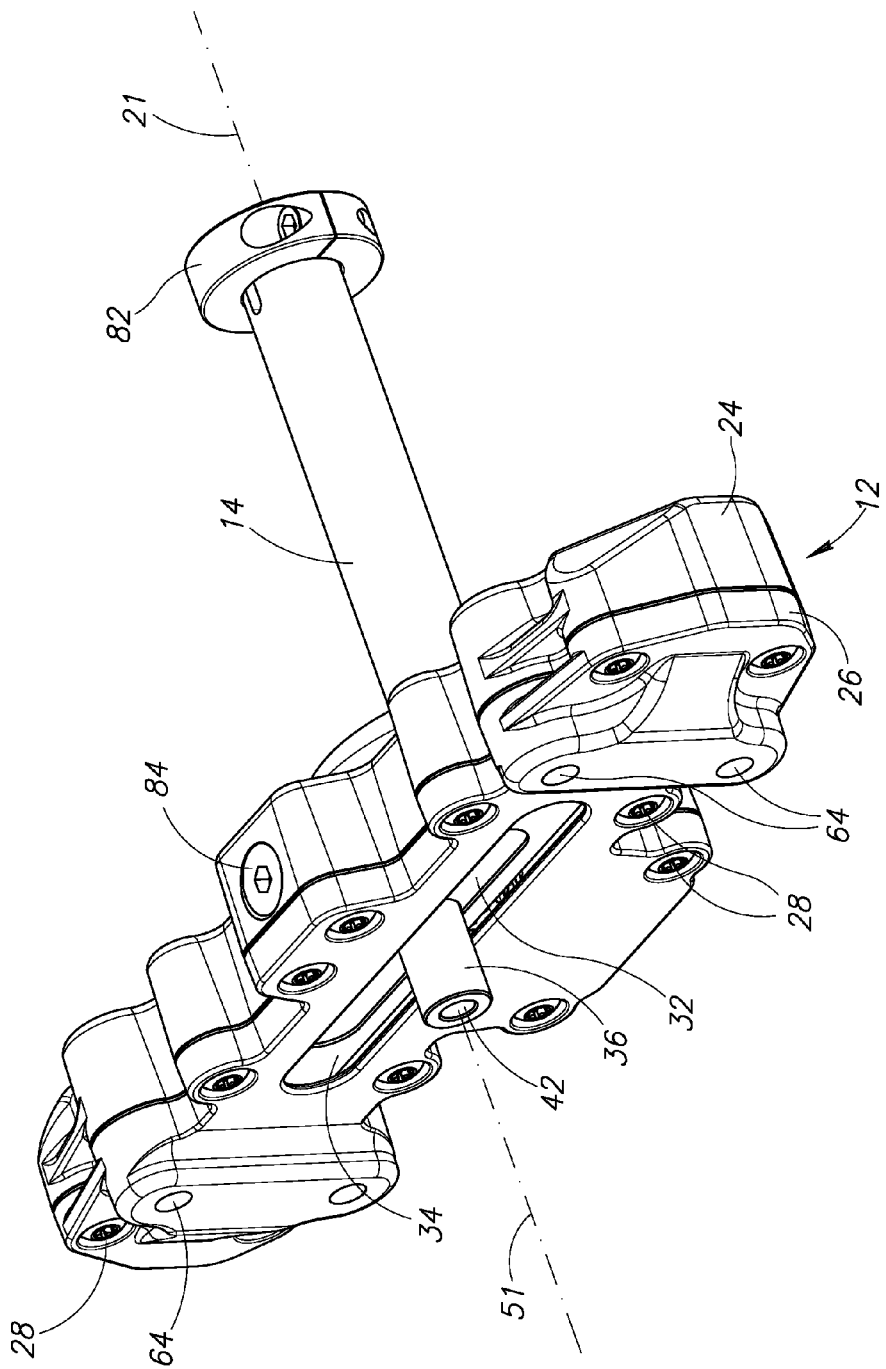
FIG. 2A is an isometric view of the steering housing and pinion shaft from a front view in the first embodiment.

FIG. 2A illustrates steering housing 12 and pinion shaft 14, whereby the steering pin 36 extends through a slot in the front steering housing 26 and beyond the perimeter of steering housing 12. Steering pin 36 is coupled to the rack inside the internal cavity of steering housing 12 (see FIGS. 4 and 6). Steering pin 36 has a center axis 51 that is substantially parallel to center axis 21 of pinion shaft 14. Steering pin 36 further includes a threaded bore 42 for receiving steering pin fastener 44 and coupling to rack carrier 13, as shown in FIG. 3A.

Figure 2B:
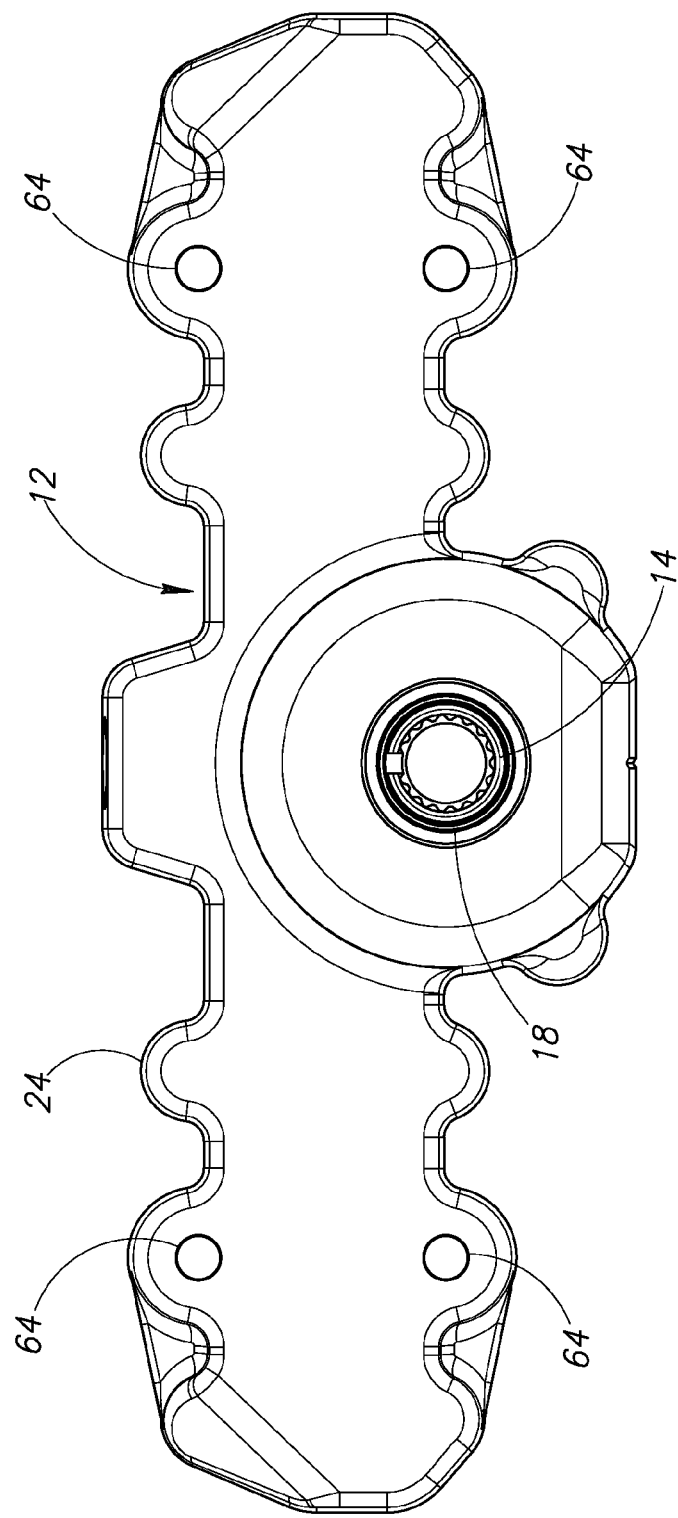
FIG. 2B is a back view of the steering housing and pinion shaft in the first embodiment.

FIG. 2B illustrates a back view of rear steering housing 24 and pinion shaft 14 positioned in the center of in opening 18 in the rear steering housing. Holes 64 through steering housing 12 receive fasteners 25 as shown in FIG. 3A.

Figure 2C:
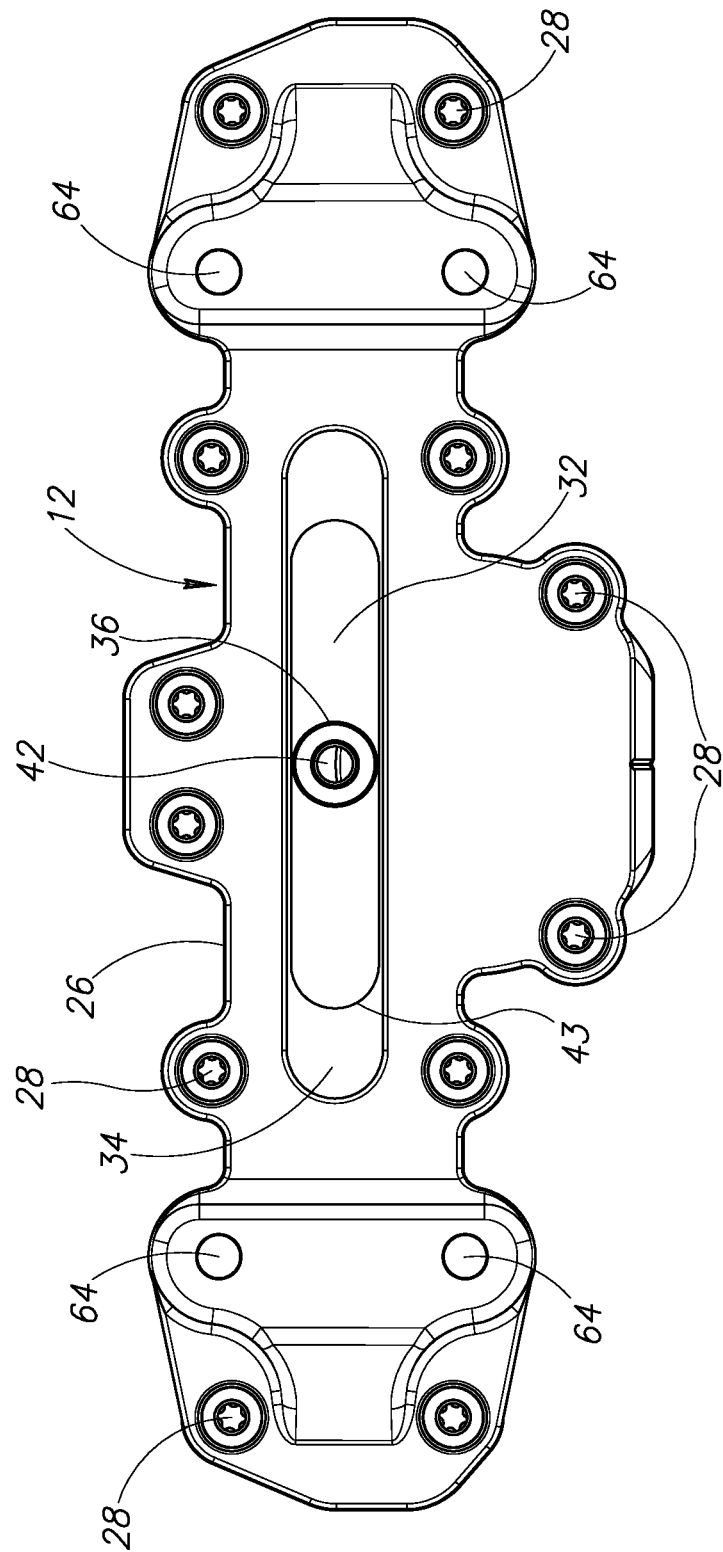
FIG. 2C is a front view of the steering housing and steering pin in the first embodiment.

FIG. 2C illustrates a front view of front steering housing 26 and steering pin 36 positioned in the center of the slot of front steering housing 26. Threaded bore 42 is provided in the center of steering pin 36. A sealing plate 34 is provided within the internal cavity of steering housing 12, and includes a slot 43 to allow lateral travel of the steering pin and rack. A rack plate 32 is provided between sealing plate 34 and the rack (see FIG. 6 for an exploded view). Fasteners 28 secure front and back housings to one another.

Figure 3A:
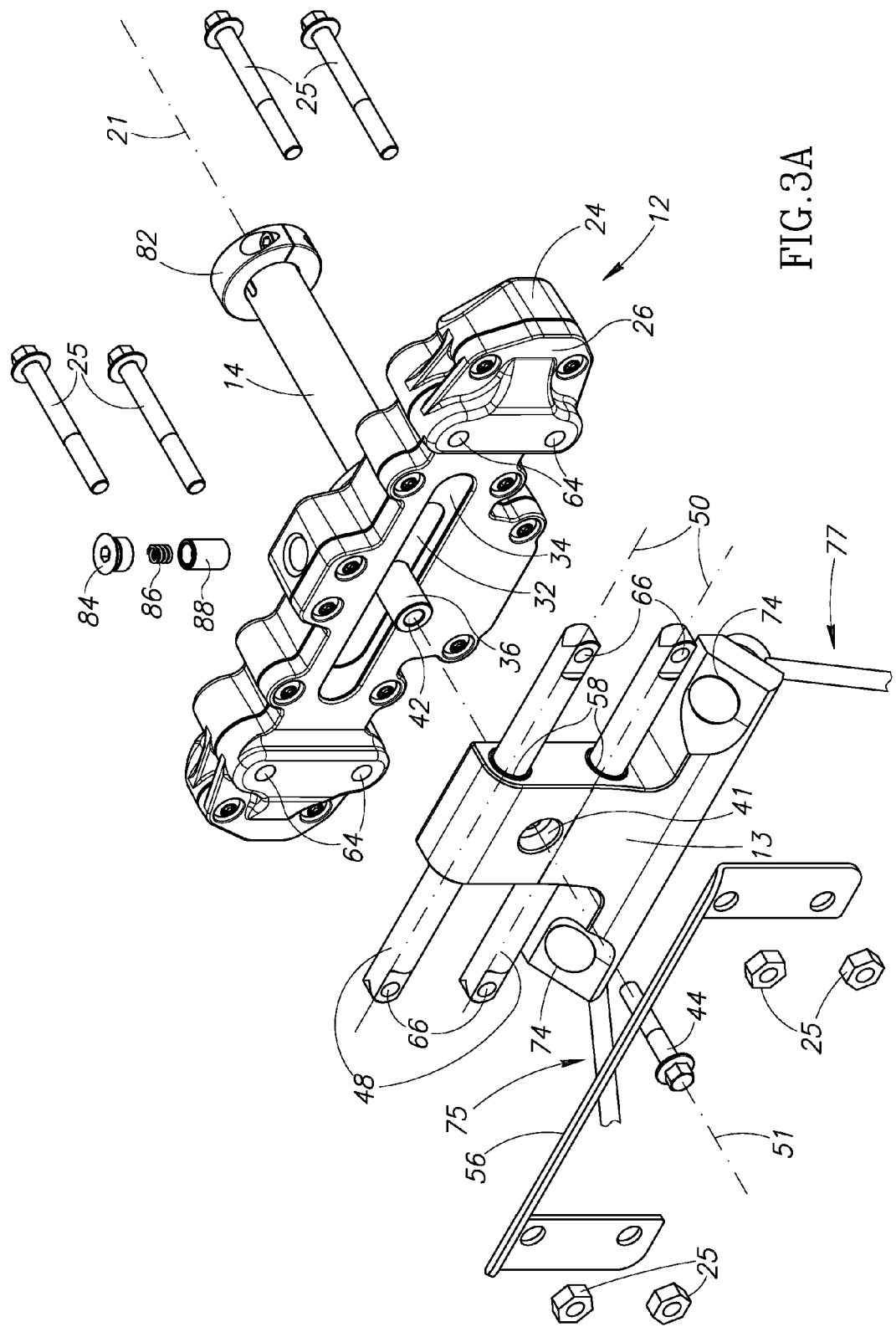
FIG. 3A is a partially exploded isometric view of the compact steering mechanism coupled to the rack carrier by the steering pin fastener in the first embodiment.

FIG. 3A illustrates a partially exploded view of steering housing 12 and steering pin 36 coupled to rack carrier 13 by steering pin fastener 44. The steering pin 36 extends through a hole 41 in the center portion of rack carrier 13. Hole 41 is a counter sunk hole to receive steering pin fastener 44 and firmly secure steering pin 36 to rack carrier 13. Steering pin 36 and hole 41 have a center axis 51 that is parallel to center axis 21. Fasteners 25 couple steering housing 12 through holes 64 and couple support shafts 48 through holes 66 for coupling to a bracket 56 and chassis of the vehicle. The fasteners are a combination of nuts and bolts. Support shafts 48 are slidably coupled to rack carrier 13 by lateral holes 58. Support members 48 have center axes 50 that are perpendicular to center axis 21 of pinion shaft 14. Holes 74 at the lower portion of rack carrier 13 are angled relative to axis 21 such that the center axes of holes 74 are horizontal to the surface of travel. Holes 74 are spatially positioned on either side of steering pin 36. Each of holes 74 are sized to receive a right tie rod 75 and a left tie rod 77, respectively. The tie rods 75, 77 are couplable to ground engaging members of a vehicle.

Figure 3B:
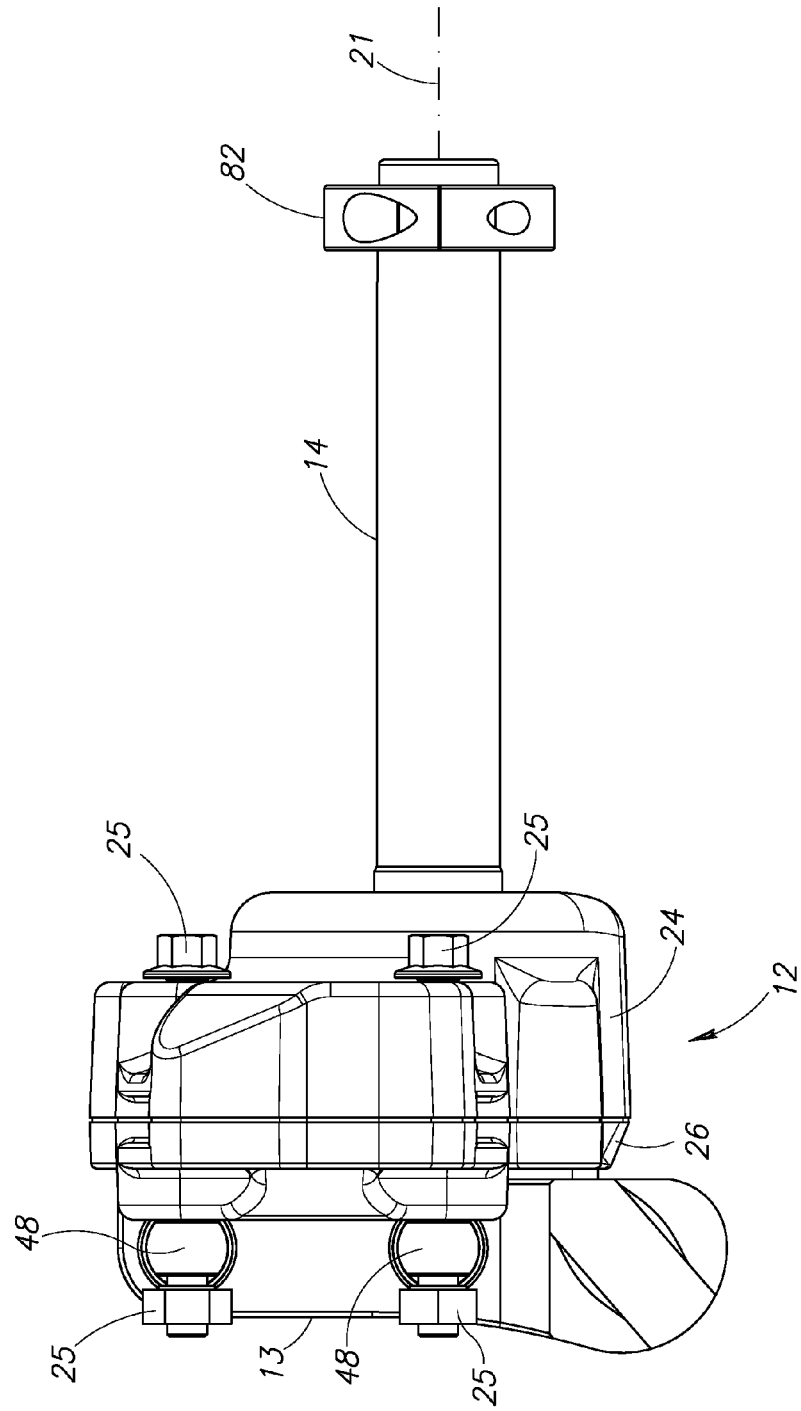
FIG. 3B is a side view of the steering housing coupled to the rack carrier in the first embodiment.
Figure 3C:
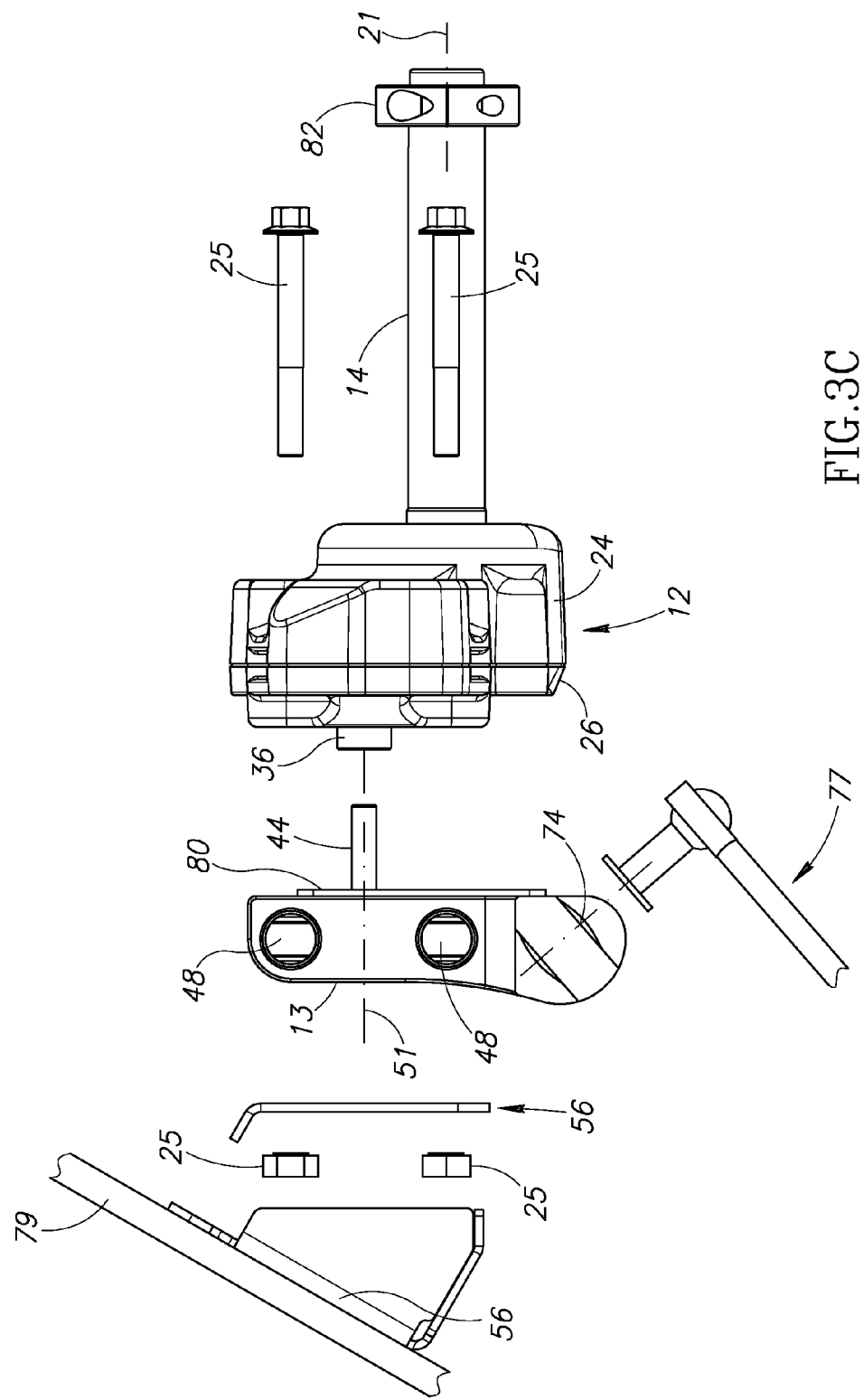
FIG. 3C is a partially exploded side view of the steering housing, the rack carrier, and the bracket in the first embodiment.
Figure 3D:
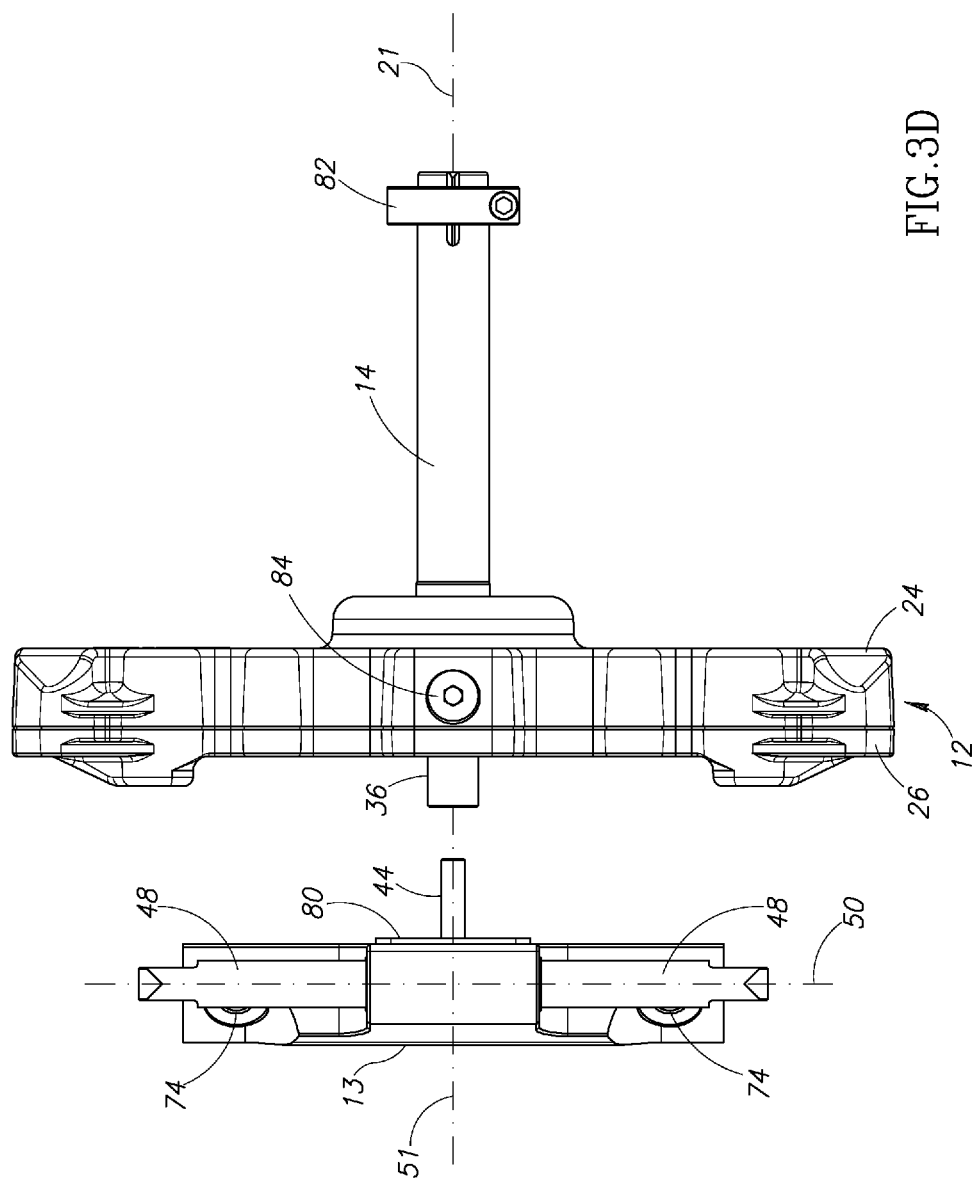
FIG. 3D is a partially exploded top view of the steering housing and rack carrier in the first embodiment.

FIGS. 3B, 3C, and 3D illustrate side views and a top view of steering housing 12 coupled to rack carrier 13 via fasteners 25. Support members 48 have center axes 50 that are perpendicular to center axis 21 of pinion shaft 14. The figures further illustrate steering housing 12 in relation to rack carrier 13 and bracket 56 (FIG. 3C). Bracket 56 is attached to a chassis 79 of a vehicle. In one embodiment, Steering pin 36 and steering pin fastener 44 have a center axis 51 that is parallel to center axis 21. Threaded plug 84 is provided at the top end of back steering housing 24 to provide adjustment of the rack (see FIG. 4). A pad 80 is coupled to rack carrier 13 and pressed against front steering housing 26 to provide smooth travel of rack guide 13 relative to the steering housing. Left tie rod 77 is shown exploded from hole 74 on rack carrier 13 to which it is attached.

Figure 4:
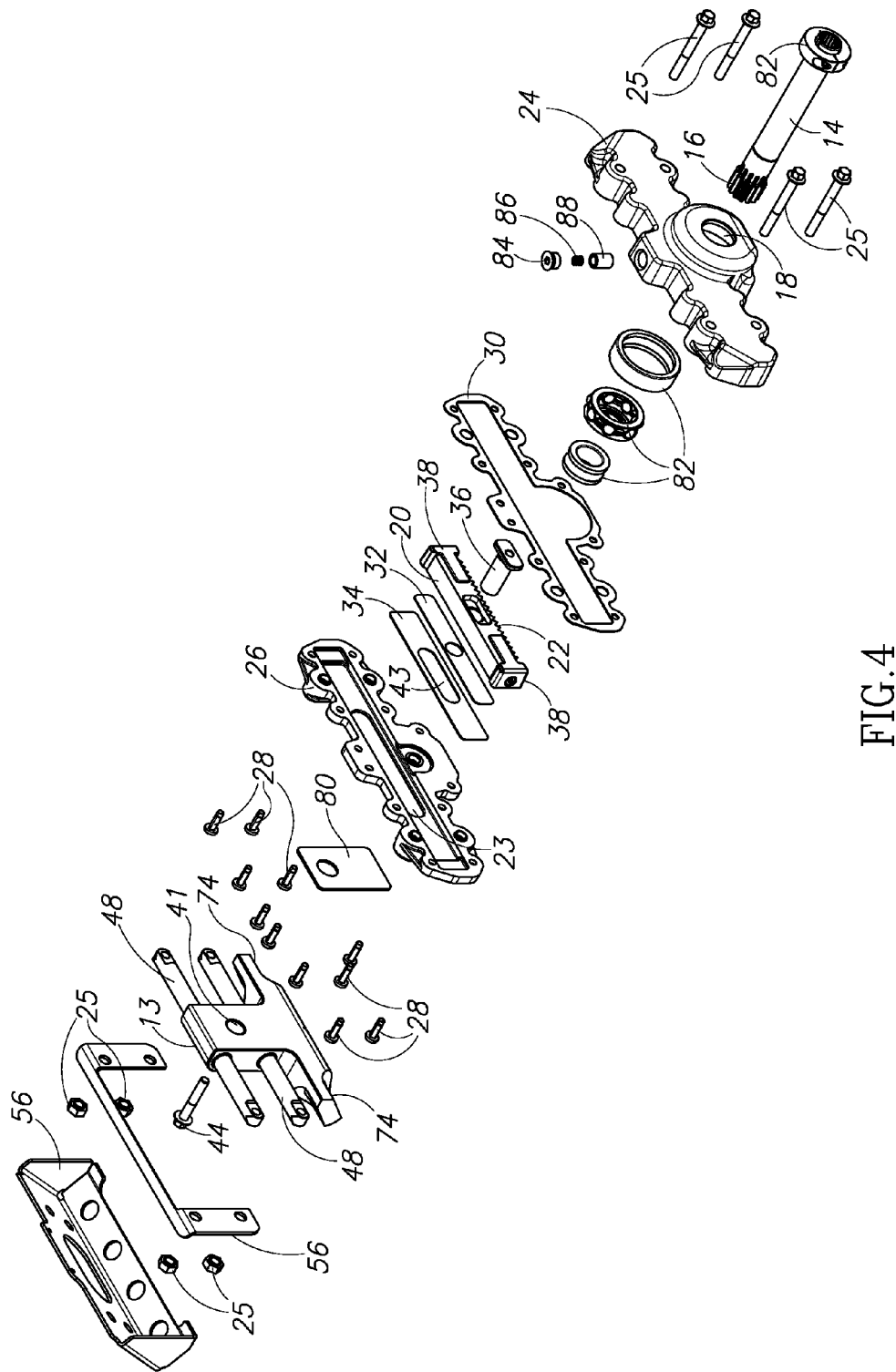
FIG. 4 is an exploded view of the compact steering mechanism and the rack in the first embodiment.

FIG. 4 illustrates an exploded view of compact steering mechanism 10. Pinion shaft 14 includes a pinion 16 on one end and collar 82 on the other end. Pinion shaft 14 extends through opening 18 and is coupled to back steering housing 24 by a bearing 82 that is a ball bearing including steel balls and races to allow freedom of rotation of pinion shaft 14. Gasket 30 is disposed between upper and front steering housings. Steering pin 36 is coupled to rack 20 by a slot in rack 20 and through a center hole of the rack. Rack 20 includes teeth 22 on its lower end for meshing with pinion 16. Rack 20 includes rack guides 38 coupled on both ends of the rack. Rack plate 32 is engaged against a side of rack 20 and includes a hole 83 for receiving steering pin 36. Sealing plate 34 includes slot 43 for receiving an end of steering pin 36 and allowing steering pin 36 and rack 20 to freely travel in the lateral directions. Similarly, front housing 26 includes a slot 23 for receiving steering pin 36.

Rack carrier 13 includes hole 41 for receiving steering pin 36 and steering fastener 44 to firmly secure rack carrier 13 to the output member (steering pin 36 in this embodiment). A pad 80 is positioned between rack carrier 13 and back steering housing 26. The pad 80 may be glued or fastened to rack carrier 13 to reduce chatter as rack carrier 13 slides along support members 48. Bracket 56 comprises two mounting plates for firmly mounting the compact steering mechanism to the chassis of the vehicle. The mounting plates may be welded to one another to form bracket 56. The first mounting plate of bracket 56 includes holes for receiving fasteners 25 to secure the compact steering mechanism to bracket 56. The second mounting plate of bracket 56 includes holes for receiving fasteners (not shown) to secure bracket 56 and compact steering mechanism to the chassis of the vehicle. The second mounting plate is formed to position the compact steering mechanism at an upward angle for coupling to the power steering unit or steering wheel. A threaded plug 84 is coupled to an opening in front housing 24. A spring 86 is provided in the opening and between threaded plug 84 and an adjuster 88, whereby spring 86 may bias against the upper surface of rack 20 to ensure teeth 22 mesh with pinion 16 to take up backlash. The threaded plug 84 may therefore by loosened or tightened to provide a desired biasing of spring 86 and adjuster 88 against rack 20.

Figure 5:
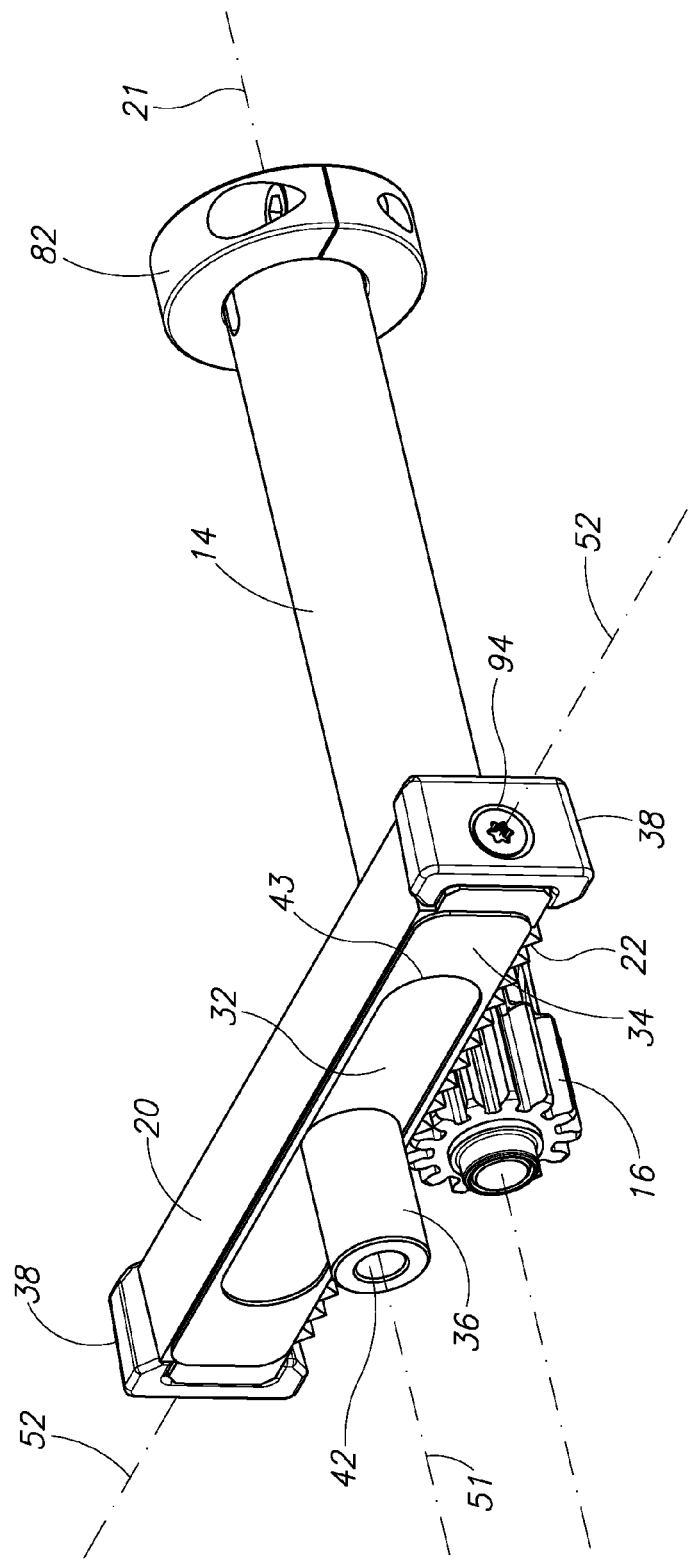
FIG. 5 is an isometric view of the pinion shaft and gear, the rack, and the steering pin in the first embodiment.

FIG. 5 illustrates an isometric view of the rack and pinion and the output member. Specifically, pinion 16 meshes with teeth 22 of rack 20 at approximately the middle portion of rack 20. Steering pin 36 (output member) is coupled to rack 20 and positioned between the ends of rack 20. Steering pin 36 includes a threaded bore 42 for receiving steering pin fastener 44. Rack 20 includes fasteners 94 securing guide members 38 to the ends of the rack. In a presently preferred embodiment, axes 51 and 21 are substantially parallel, both being perpendicular to lateral axis 52 of rack 20. Engaged to the surface of rack 20 is rack plate 32 being positioned between rack 20 and sealing plate 34.

Figure 6:
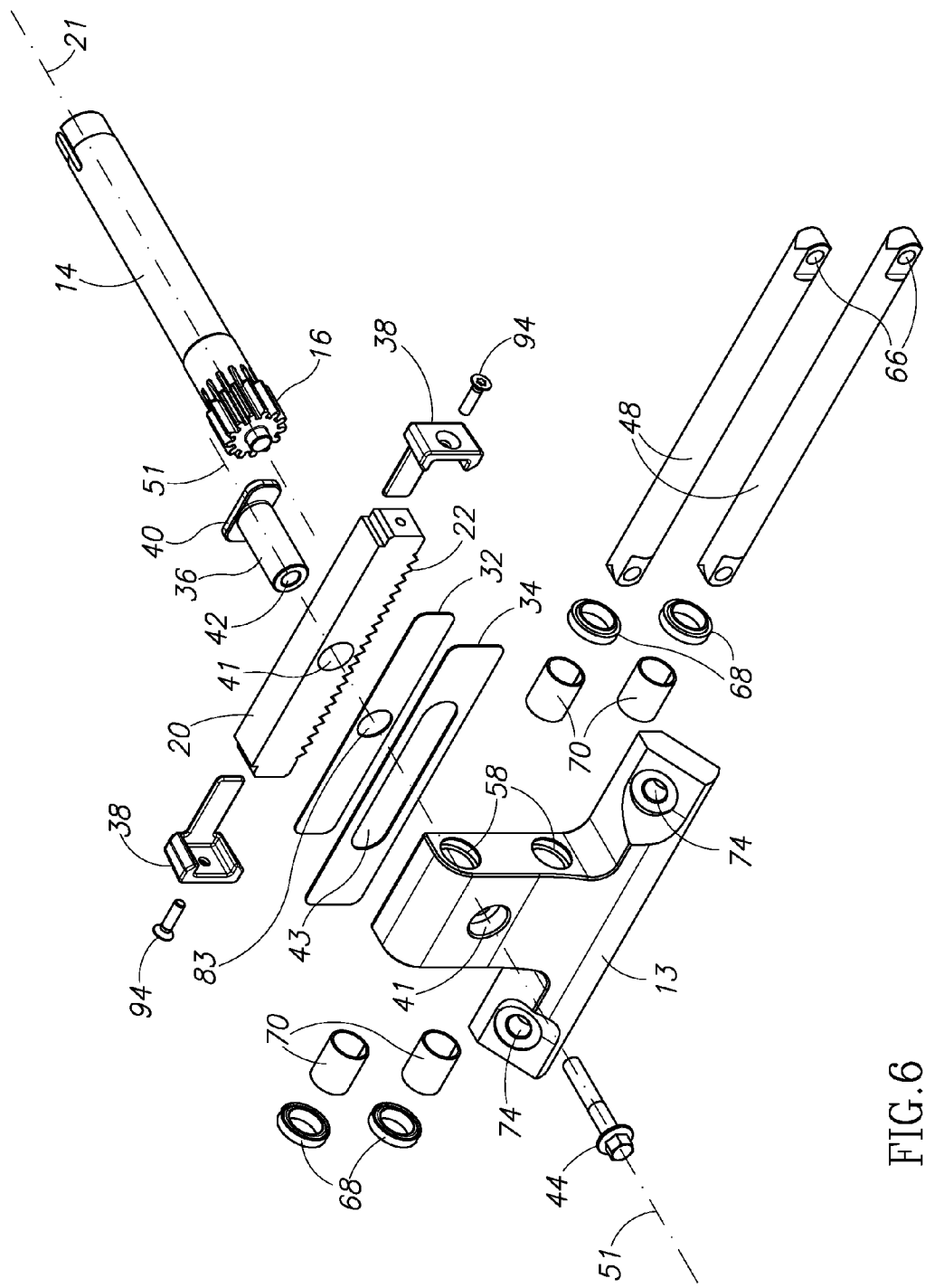
FIG. 6 is an exploded view of the rack carrier coupled to the rack via the steering pin in the first embodiment.

FIG. 6 illustrates an exploded view of rack carrier 13 coupled to rack 20 via steering pin 36. Steering pin 36 includes a flange 40 and threaded bore 42 on a first end. The second end of steering pin 36 is coupled to rack 20 through hole 41 disposed in the center portion of rack 20. As described above, steering pin 36 further extends through rack plate 32, and sealing plate 34, and into rack carrier 13. Rack carrier 13 includes lateral holes 58. Seals 68 and bushings 70 are secured into holes 58 for allowing rack carrier 13 to slide along support shafts 48. Bushings 70 are positioned within holes 58, and seals 68 are secured to the ends of holes 58. Holes 74 are positioned spatially within the ends of rack carrier 13, whereby holes 74 receive left and right tie rod assemblies for moving the wheels of the vehicle proportional to rotational movement of pinion shaft 14 and corresponding lateral movement of rack 20 and rack carrier 13.

Figure 7A:
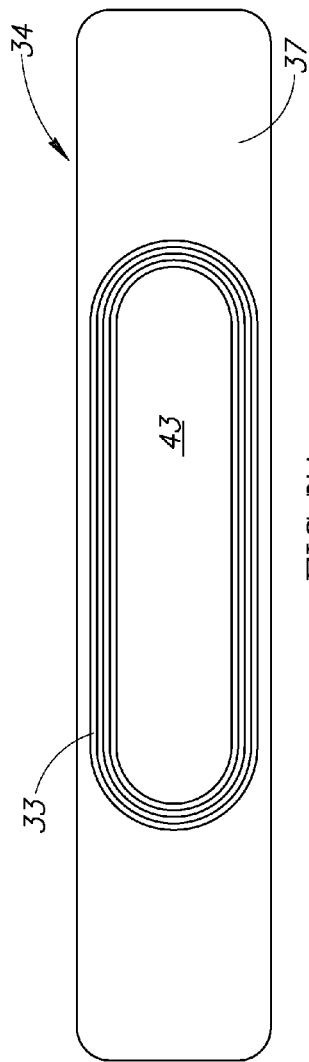
FIG. 7A is front view of the sealing plate, showing the first surface.
Figure 7B:
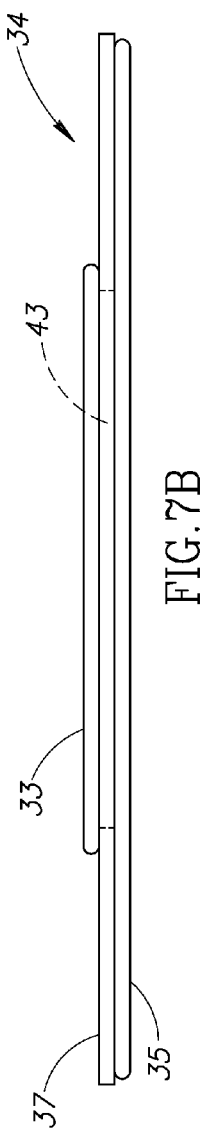
FIG. 7B is side view of the sealing plate, showing the seals on both sides of the plate.
Figure 7C:
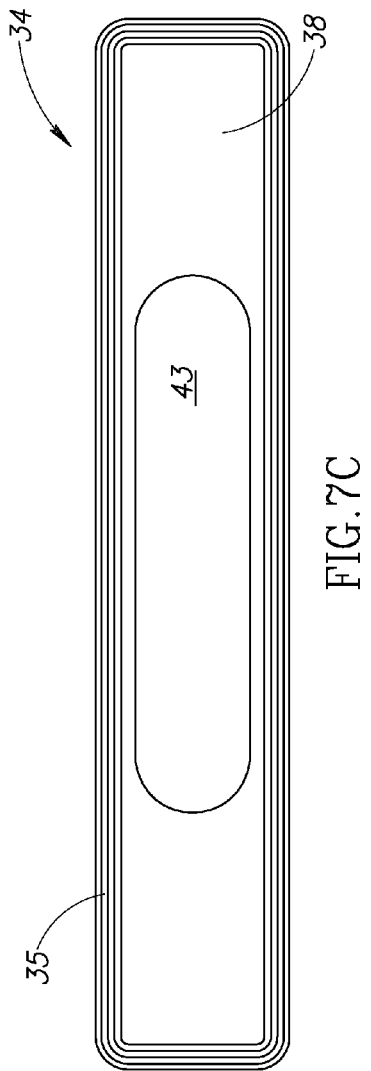
FIG. 7C is rear view of the sealing plate, showing the second surface.

FIGS. 7A, 7B, and 7C show a rear, side, and front view, respectively, of the sealing plate. On a first surface 37, a seal 33 is secured near the perimeter of slot 43. Surface 37 engages against rack plate 32. Surface 38 includes seal 35 secured near the perimeter of plate 34. Surface 38 engages against front steering housing 26 and may travel laterally within the steering housing as rack 20 moves. The seals may be any suitable material that prevents debris or fluid from entering the steering housing, such as a polymer or rubber. Bores may be formed into surface 37 and surface 38 to firmly secure seal 33 and seal 35 to sealing plate 34. In the preferred embodiment, the seals are bonded onto sealing plate 34 and into small holes in the sealing plate to securely fix the seals. In the preferred embodiment, the seals 33 and 35 each comprise two ribs parallel to one another and extending around the perimeter of surfaces 37 and 38, as shown in FIGS. 7A and 7C. As rack plate 32 moves with steering pin 36, it slides against seal 33. Once pin 36 engages an end of slot 43 and continues movement, pin 36 moves plate 37 with it. Seal 35 slides against the interior of front steering housing 26 to maintain a seal, keeping water or debris from entering into the steering housing.

Figure 8A:
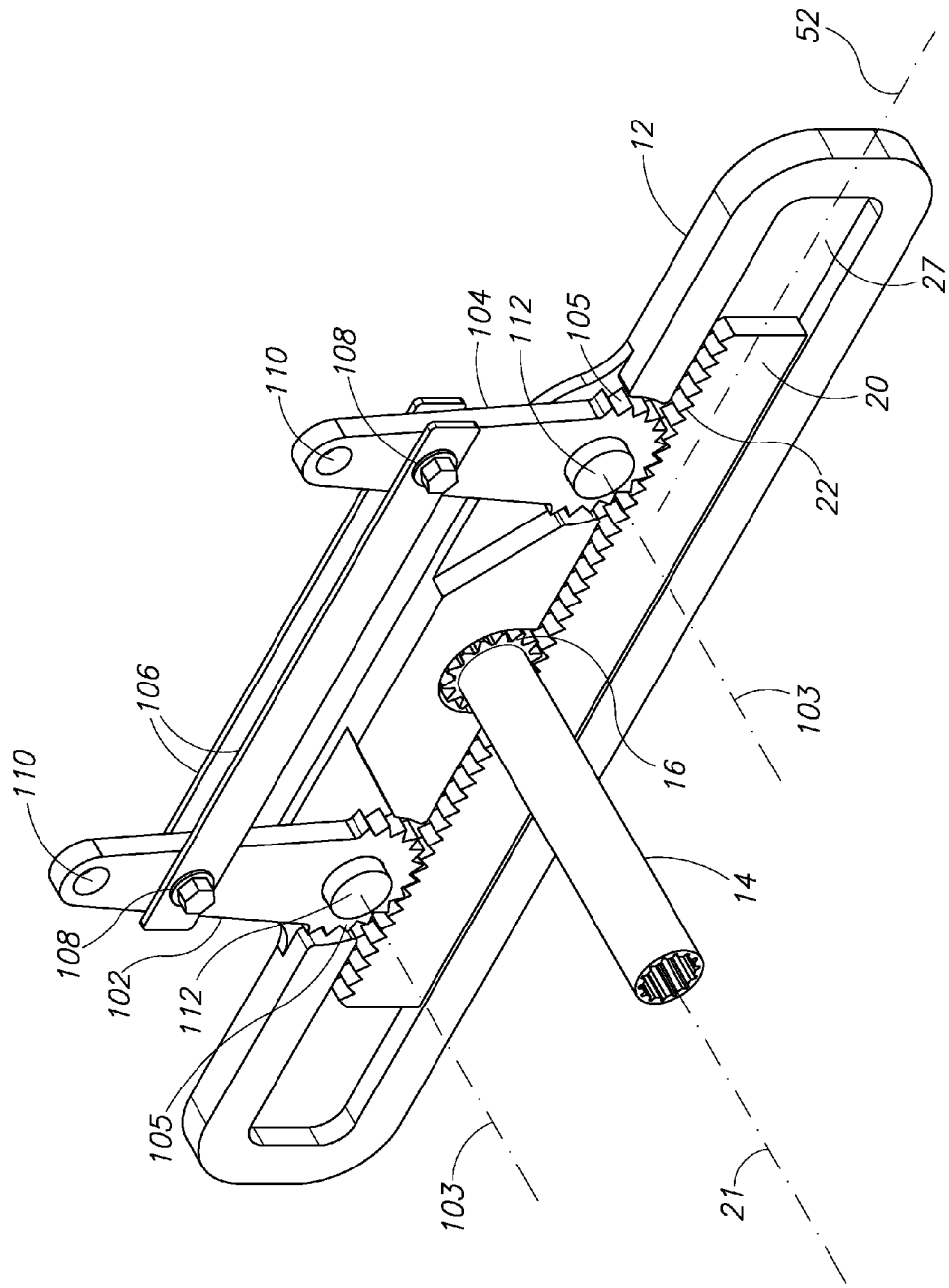
FIG. 8A is an isometric view of the steering housing and rack including first and second gear members meshing with the rack in the second embodiment.
Figure 8B:
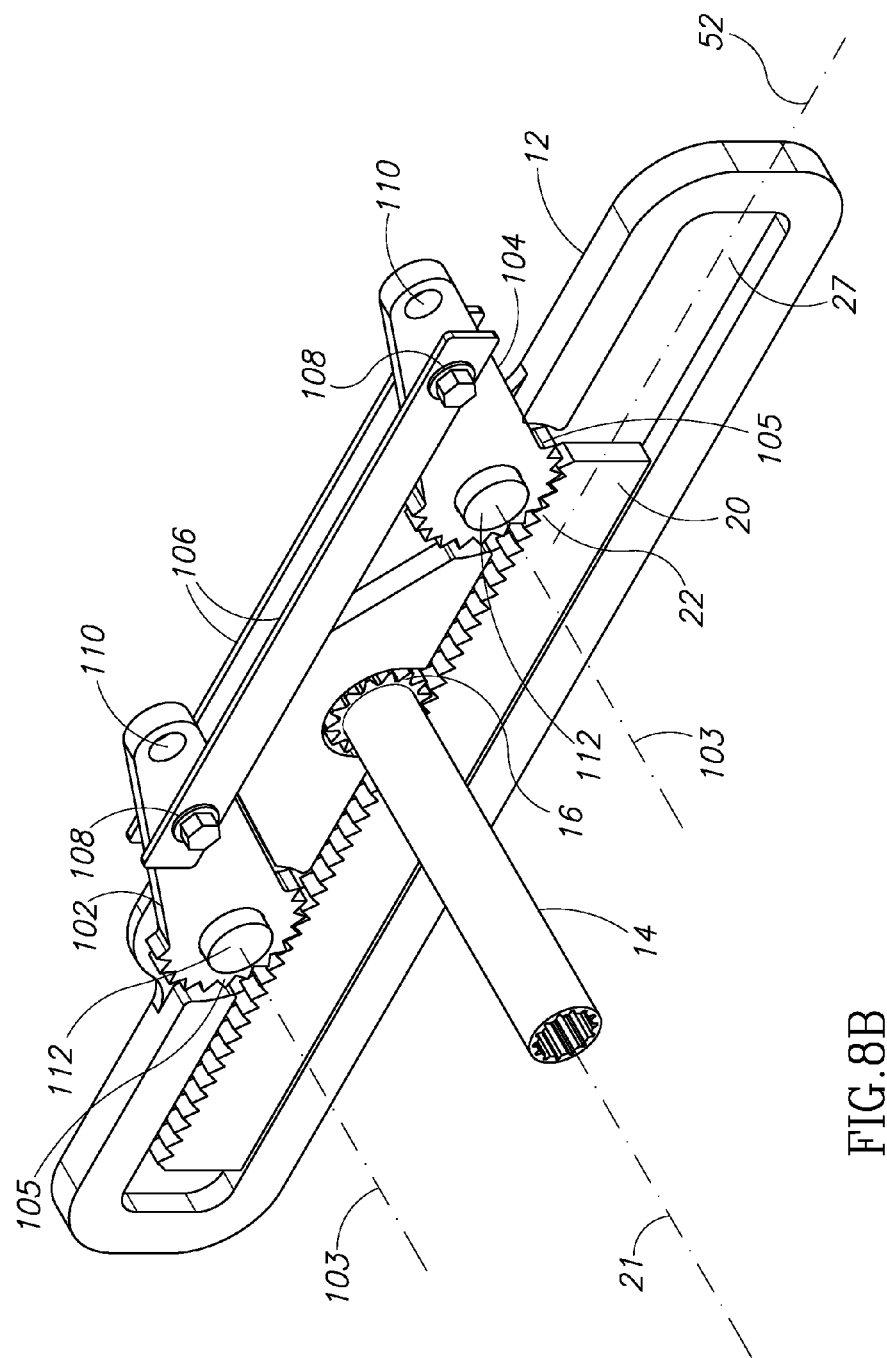
FIG. 8B is an isometric view of the embodiment of FIG. 8A, showing the travel of the rack in the lateral direction and the rotation of the gear members.
Figure 8C:
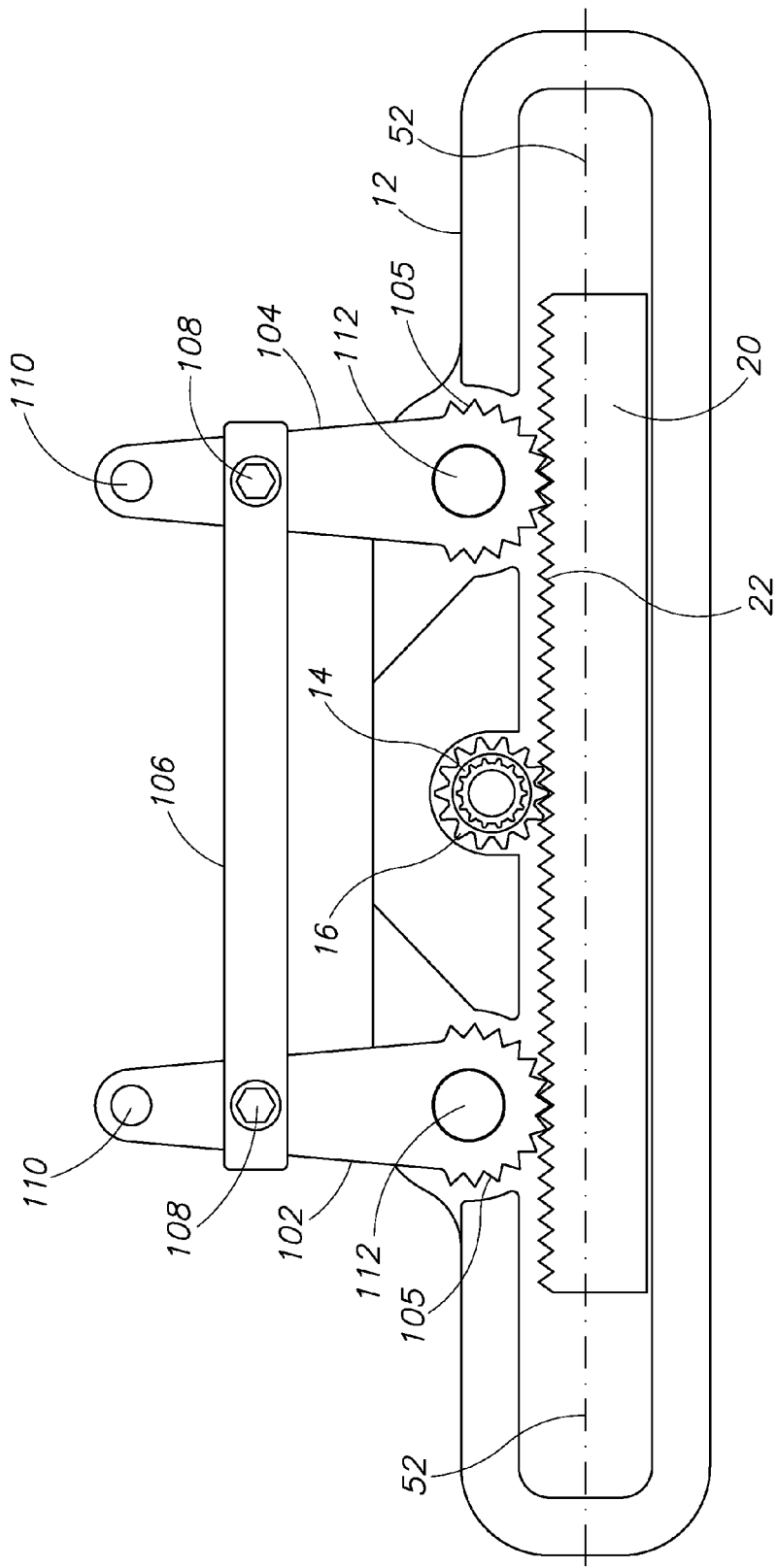
FIG. 8C is a back view of the steering housing and rack including first and second gear members meshing with the rack in the second embodiment.

FIGS. 8A, 8B, and 8C illustrate one configuration of the second embodiment described above. Steering housing 12 includes first gear member 102 and second gear member 104, each having teeth 105 on their first ends. Teeth 105 mesh with teeth 22 of rack 20 between the ends of rack 20. In this embodiment, the gear members are pivotally secured to steering housing 12 by shafts 112 secured to the housing. As rack 20 travels about its lateral axis 52, gear members 102 and 104 rotate about center axes 103, whereby center axes 103 are substantially parallel to center axis 21 of pinion shaft 14. First gear member 102 is positioned to the left of pinion 16 and pinion shaft 14, and second gear member 104 is positioned to the right of pinion 16 and pinion shaft 14. At the second ends of gear members 102 and 104, holes 110 are included for receiving left and right tie rod assemblies. The gear members, however, may both be positioned on one side of the pinion shaft 16 and still achieve the desired resulting output to the pair of tie rods. A stabilization link 106 may be coupled between the center portions of the gear members and pivotally coupled by fasteners 108. FIG. 8B shows rack 20 positioned to the left side of housing 12. Gear members 102 and 104 are driven in the opposite direction, due to rotating the pinion shaft 14 in a clockwise direction, thereby moving the wheels of the vehicle with the tie rods extending from the gear members to the steering knuckles secured to the wheels (not shown). FIG. 8C is a back view of the steering housing and rack having first and second gear members meshing with the rack in the second embodiment, as described above and shown in FIGS. 8A and 8B.

Figure 8D:
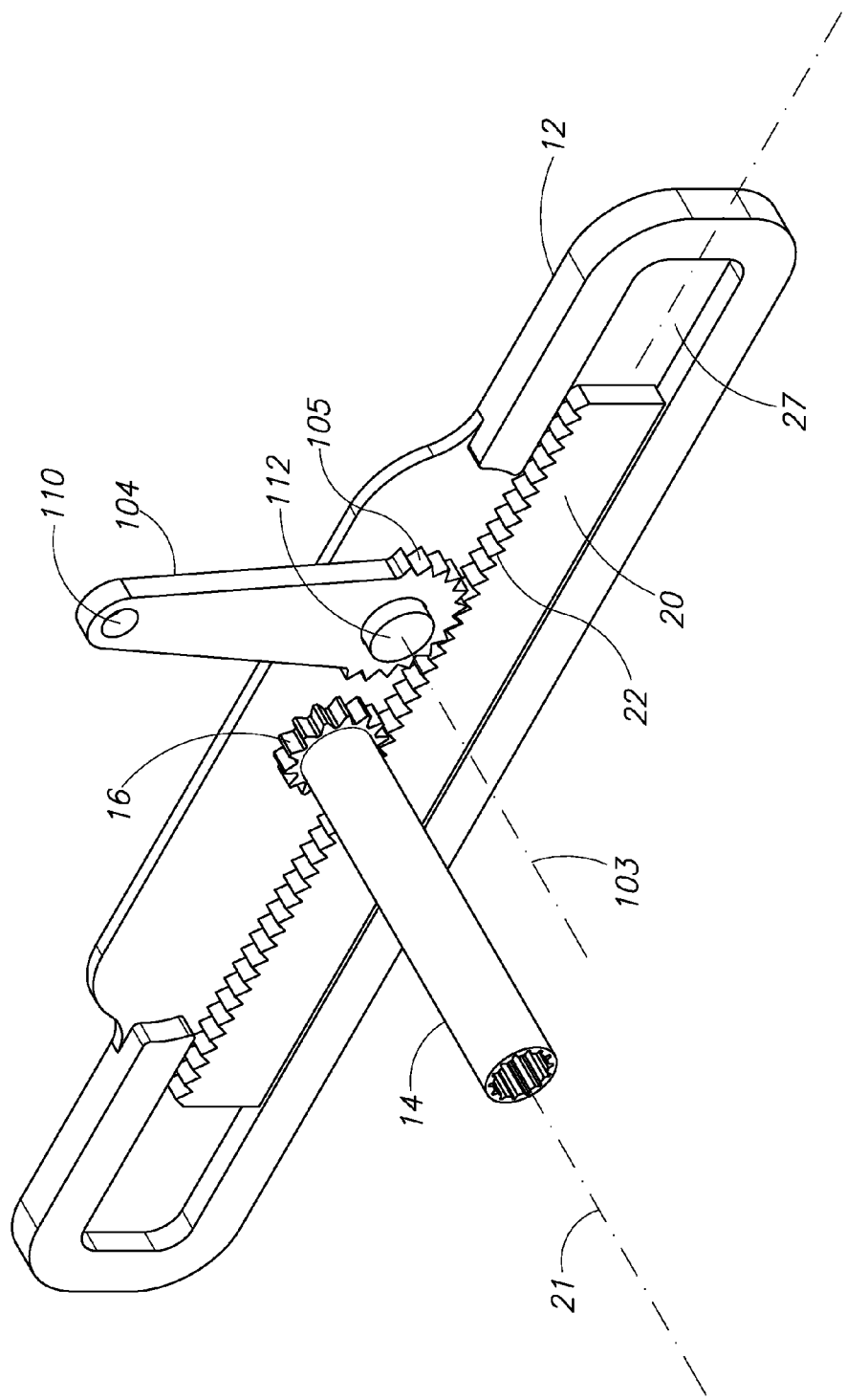
FIG. 8D is an isometric view of the steering housing and rack including a single gear member meshing with the rack.

FIG. 8D is another configuration of the second embodiment, whereby the output member is a single gear member 104 meshing with teeth 22 of rack 20. Gear member 104 is positioned to the right of pinion shaft 14 and between pinion 16 and the end of rack 20. Hole 110 is therefore coupled to both the left and right tie rod assemblies. Alternatively, gear member 104 may be positioned on either side of pinion shaft 16, or may be positioned in the middle portion of rack 20 to provide a center take-off point for steering the vehicle.

Figure 9A:
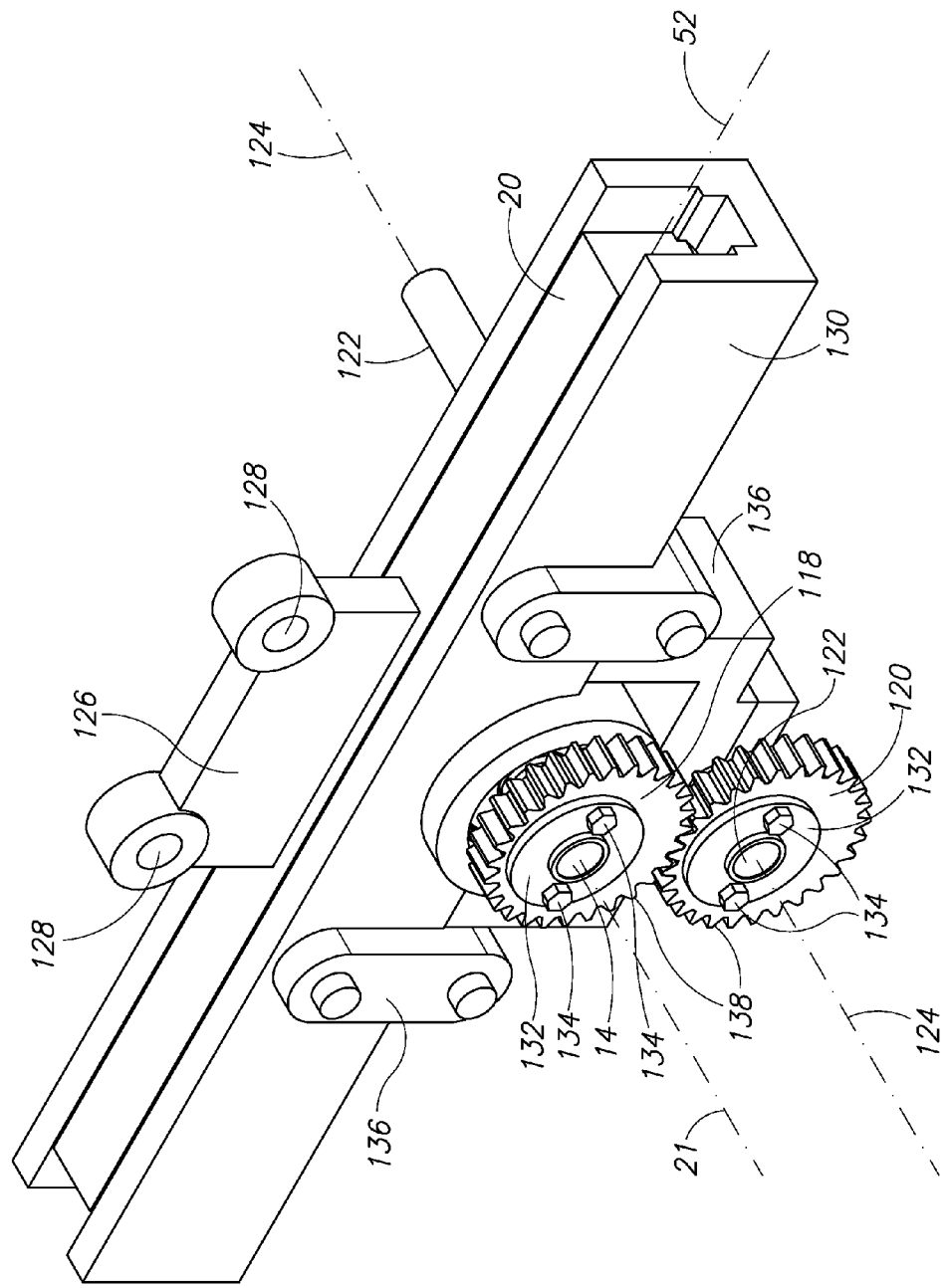
FIG. 9A is an isometric view of the compact steering mechanism including first and second gears secured at off-center positions above the centers of the gears in the third embodiment.

FIG. 9A is one configuration of the third embodiment described above. More specifically, the compact steering mechanism includes first gear 118 and a second gear 120 coupled to a rack guide 130 and rack mount 136, all being disposed within a steering housing (not shown). First gear 118, having a center, is coupled to pinion shaft 14 at an off-center portion of first gear 118 and above the center of first gear 118, when rack 20 is centered. Similarly, second gear 120, having a center, is coupled to a steering shaft 122 at an off-center portion of second gear 120 and above the center of the second gear 120, when rack 20 is centered (see FIG. 9E showing a side view of the gears coupled to the shaft above center). The teeth of first gear 118 mesh with the teeth of second gear 120. The center axis 124 of steering shaft 122 is parallel to center axis 21 of pinion shaft 14. Plates 132 may be coupled to the gears by fasteners 134 to secure first gear 118 to pinion shaft 14 and to secure second gear 120 to steering shaft 122. Alternately, the shafts may be splined or keyed for proper rotational positioning of the gears relative to the shafts. In this embodiment, steering shaft 122 is coupled to the steering wheel of the vehicle. Rack guide 130 includes a stepped slot formed laterally along the length of rack guide 130 to guide rack 20 as it moves laterally within the steering housing and to provide clearance of the teeth of rack 20 from rack guide 130.

Flange 126 is secured to rack 20 on the opposite surface of the teeth of rack 20, and includes two opposing holes 128 positioned on either side of pinion shaft 14 and within the ends of rack 20. The holes are provided for coupling to left and right tie rod assemblies of the vehicle.

When steering shaft 122 is rotated in a desired direction by the steering wheel, second gear 120 rotates in the desired direction about the axis of shaft 122 and about off-center axis 124 of gear 120. This rotation causes slower initial rotational speed of first gear 118 in the opposite direction of second gear 120 about a similar off-center axis (axis 21) of first gear 118. Such rotation of first gear 118 causes rotation of pinion shaft 14 and pinion 16 (pinion 16 is positioned in rack guide 130 and under rack 20; see FIG. 9C). This rotation of pinion 16 thereby causing lateral movement of rack 20 and the coupled flange 126. The speed of initial movement of rack 20 is reduced relative to that of the steering shaft due to the relative distances of the engaged gear teeth from the respective axes of rotation of the gears. The configuration provides variable output rotational speed and acceleration relative to the input rotational speed for slow steering response from the middle portion of rack 20 and more rapid response at the ends.

Figure 9B:
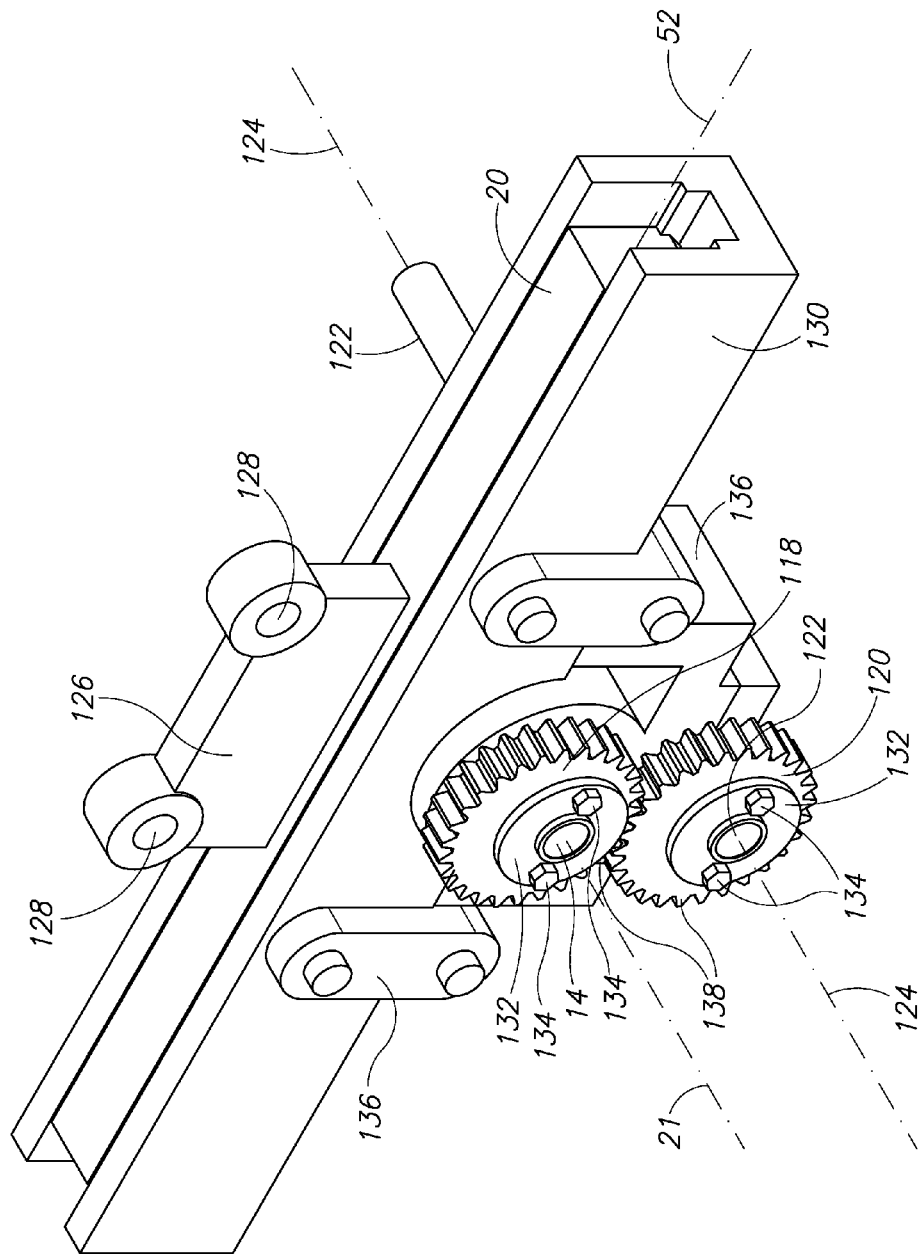
FIG. 9B is an isometric view of the compact steering mechanism including first and second gears secured at off-center positions below the centers of the gears in the third embodiment.

FIG. 9B illustrates an inverse of the configuration shown in FIG. 9A, whereby first gear 118 and second gear 120 are secured at off-center positions below the center of the gears—with the rack substantially centered. This inversed configuration provides similar variable output rotational speed and acceleration relative to the input rotational speed and acceleration for initial rapid steering response that decreases as the gears are rotated. Alternatively, the gears may be secured to their respective shafts to the left or right of center of gears to provide alternative variable output steering response.

Figure 9C:
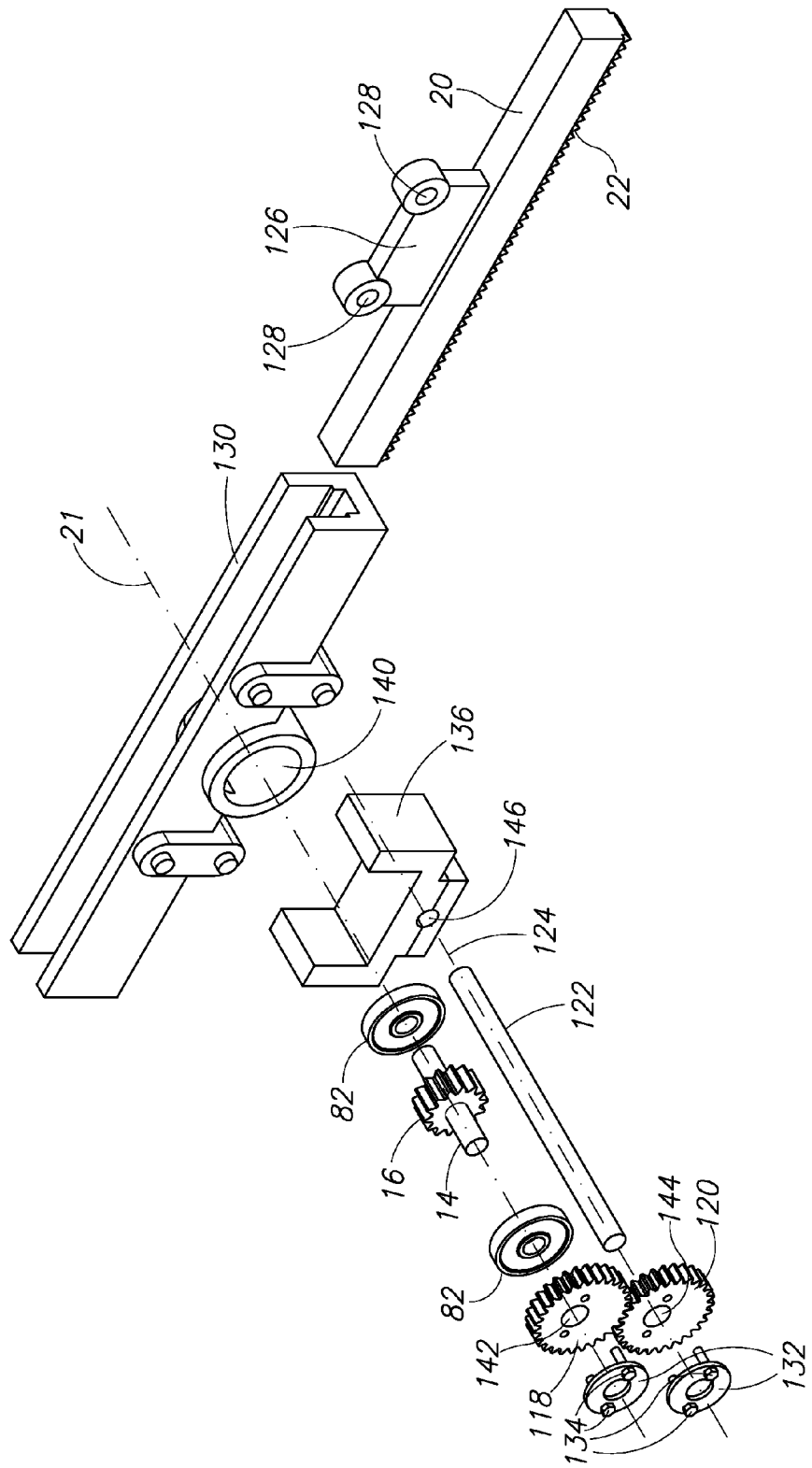
FIG. 9C is an exploded view FIG. 9A.

FIG. 9C illustrates the steering mechanism shown in FIG. 9A in an exploded view. Steering shaft 122 extends through an elongated hole 146 in rack mount 136 and through hole 144 of second gear 120. The end of steering shaft 122 is coupled to plate 132 with fasteners 134 secured to second gear 120 to provide additional structural support as steering shaft 122 and second gear 120 cooperatively rotate. The end of pinion shaft 14 may be coupled to first gear 118 in a similar fashion. Bearings 82 are coupled to pinion shaft 14 and to both ends of opening 140 in rack guide 130 to allow pinion shaft 14 to freely rotate. Pinion 16 is positioned between the bearings and within opening 140 to mesh with rack 20 (see FIG. 9E for a side cutaway view). Rack mount 136 is coupled to rack guide 130 and to the steering housing by any suitable securing means. In one embodiment, axis 124 and 21 are substantially parallel.

Figure 9D:
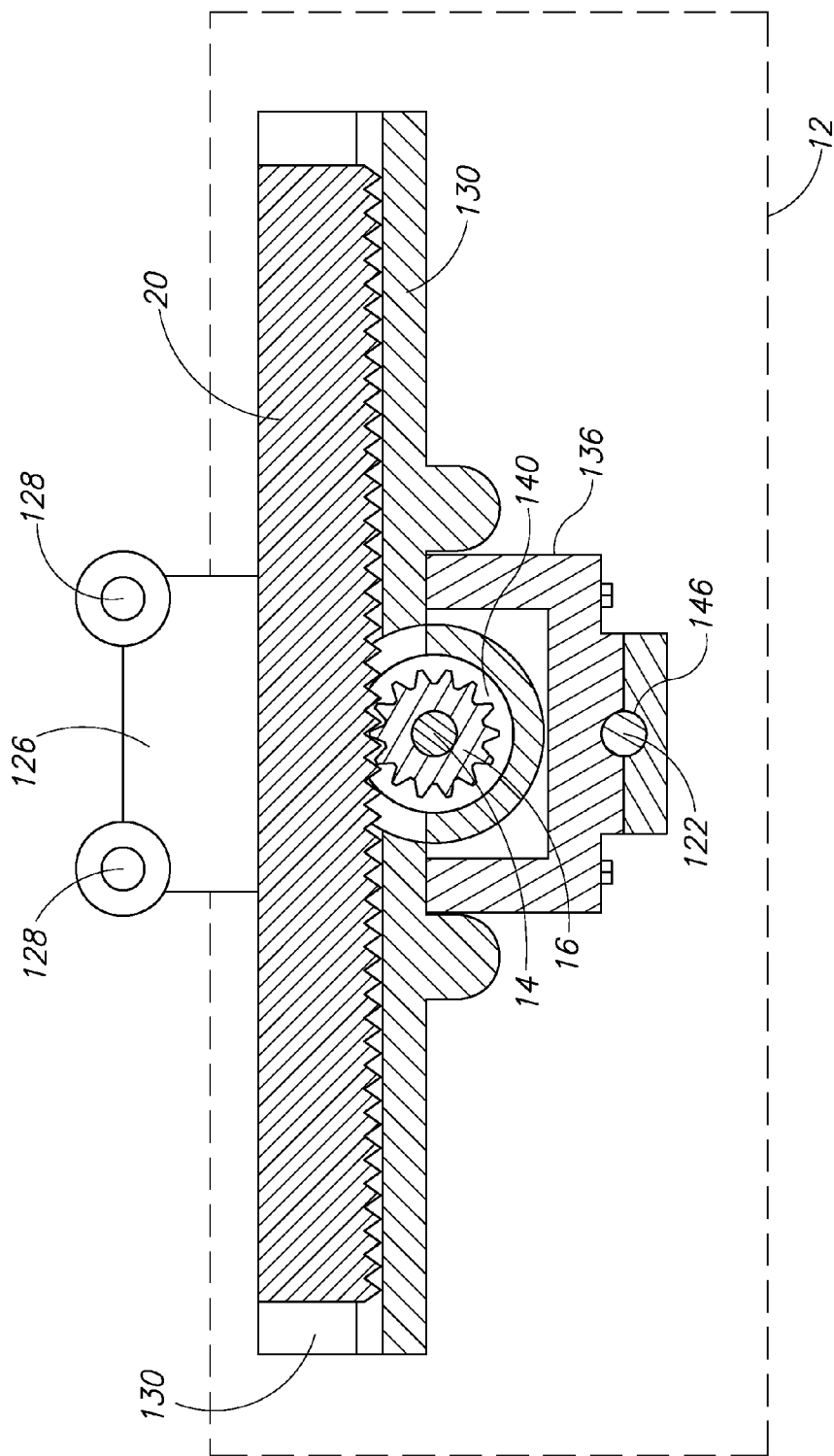
FIG. 9D is a front cutaway view of the rack and the pinion and output member, in the third embodiment.
Figure 9E:
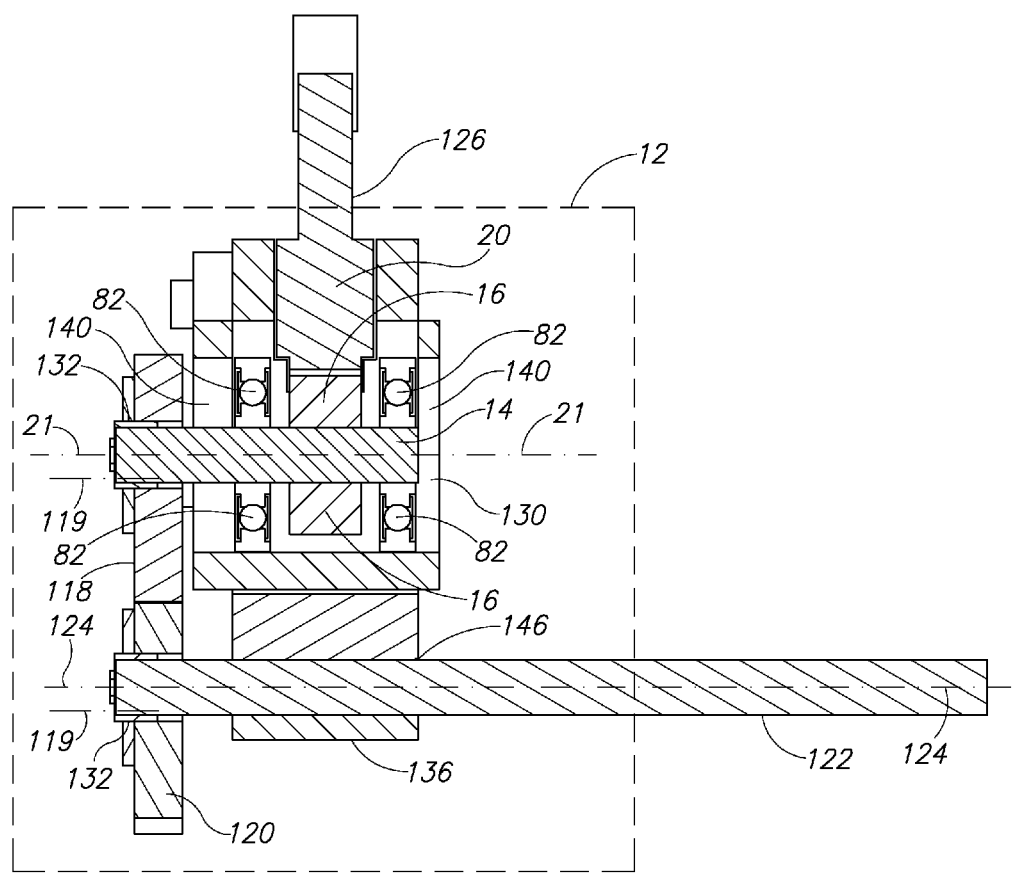
FIG. 9E is a side cutaway view FIGS. 9A and 9C.

FIG. 9D provides a front cutaway view of some components of the steering mechanism shown in FIGS. 9A and 9B. Steering housing 12 is provided as shown to allow flange 126 and holes 128 to extend beyond the perimeter of the steering housing for coupling to the pair of tie rods (similar to the steering pin of the first embodiment described above). As described above, pinion 16 is positioned within opening 140 of rack guide 130, wherein the teeth of pinion 16 mesh with the teeth of rack 20 at the middle portion of rack 20. As with previous embodiments, pinion 16 and flange 126 may be coupled along varying portions of rack 20 while maintaining the spirit of the invention.

FIG. 9E illustrates the relationship of the gears coupled off-center. It is shown that first gear 118 is coupled to pinion shaft 14 at an off-center position above center 119, and second gear 120 is also coupled to steering shaft 122 at the off-center position above center 119. It is further illustrated that two bearings 82 are secured within opening 140 and positioned on either side of pinion 16. The teeth of rack 20 extend below the stepped slot in rack guide 130, whereby the teeth mesh with pinion 16 at an upper portion of the pinion and a middle portion of rack 20. Steering shaft 122 extends through hole 146 in rack mount 136. Steering shaft 122 may extend through an opening (not shown) in steering housing for coupling to the steering wheel of the vehicle, similar to the pinion shaft coupled to the back steering housing in the first embodiment. Plates 132 are secured to first and second gears 118 and 120 and to the ends of steering shaft 122 and pinion shaft 14 to provide adequate support when torque is applied by steering shaft 122 upon rotation.

While preferred embodiments of the invention have been illustrated and described, as noted above, many changes can be made without departing from the spirit and scope of the invention. For example, the output member may be coupled to the rack at various locations and positions on the rack. Furthermore, the output member and output points may be formed as part of the rack and within the ends of the rack. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A light-weight compact steering mechanism for steering right and left front ground engaging members of a vehicle with at least one tie rod, the mechanism comprising:
   a pinion shaft coupled to a pinion;
   a rack having teeth meshing with the pinion;
   an output member coupled to the rack;
   a rack carrier coupled to the output member, wherein the output member securing the rack carrier to the rack such that it moves therewith, and wherein the rack carrier is couplable to the tie rod of the vehicle; and
   at least one support member engaged to the rack carrier and extending generally parallel to the rack, the rack carrier being slideable along the support member as the output member moves in a desired direction of travel.

2. The light-weight compact steering mechanism of claim 1 wherein the at least one support member is secured to the chassis of the vehicle, and wherein the rack is structurally supported by the rack carrier, thereby reducing the weight and length of the compact steering mechanism.

3. The light-weight compact steering mechanism of claim 1 further comprising:
   a steering housing having a first and second housing portions secured to one another by a plurality of fasteners;
   an opening disposed in the central portion of the second housing portion for receiving the pinion shaft, the pinion shaft coupled to the steering wheel of the vehicle; and
   the first and second steering housing portions providing an internal cavity containing the rack, the pinion, a portion of the output member, and a sealing plate slidably coupled between the rack and the housing.

4. The compact steering mechanism of claim 3, wherein the output member is a steering pin having a first end coupled to the rack and a second opposing end extending through slots in each of the sealing plate and the first housing portion.

5. The light-weight compact steering mechanism of claim 3, wherein the support member comprises two parallel shafts secured at their ends to the housing, the rack carrier having channels to receive the shafts between the ends of the shafts.

6. The light-weight compact steering mechanism of claim 4 further comprising a rack plate wherein:
   the rack plate is between the rack and the sealing plate, the rack plate having a hole receiving the second end of the steering pin;
   the sealing plate having an outer periphery, a first surface seal, and an opposing second surface seal, the sealing plate having a slot through which the steering pin extends, the first surface seal having a seal secured adjacent the slot and the second surface seal having a seal between the slot and the outer periphery; and
   the first surface seal of the sealing plate being slidably engaged to the rack plate, and the second surface of the sealing plate being slidably engaged to an inner surface of the first steering housing portion, whereby the seals prevent debris from entering the internal cavity and prevent lubricant from leaving the internal cavity of the steering housing.

7. A light-weight compact steering mechanism for steering right and left front ground engaging members of a vehicle with at least one tie rod, the mechanism comprising:
   a pinion shaft coupled to a pinion;
   a rack having teeth meshing with the pinion;
   an output member coupled to the rack, wherein the output member is couplable to the tie rod of the vehicle;
   a steering housing having an opening disposed for receiving the pinion shaft, the pinion shaft coupled to the steering wheel of the vehicle;
   the steering housing coupled to the rack, the pinion, the output member, and a sealing plate;
   the sealing plate having opposing surfaces, wherein one surface is slidably coupled to a surface of the steering housing, and wherein the opposing surface of the sealing plate is slidably coupled a surface of a sealing member coupled to the steering housing; and
   the output member extending through a slot in the steering housing, whereby the length of the slot of the sealing plate is shorter than the length of the slot of the steering housing to allow full travel of the rack and output member while providing a compact steering mechanism with improved steering geometry.

8. The compact steering mechanism of claim 7, wherein the output member is a steering pin having a first end coupled to the rack and a second opposing end extending through slots in each of the sealing plate and the first housing portion.

9. The compact steering mechanism of claim 8 wherein the sealing member is the rack or a rack plate coupled to the rack.

10. The compact steering mechanism of claim 9 wherein:
    the rack plate is between the rack and the sealing plate, the rack plate having a hole receiving the second end of the steering pin;
    the sealing plate having an outer periphery, a first surface seal, and an opposing second surface seal, the sealing plate having a slot through which the steering pin extends, the first surface seal having a seal secured adjacent the slot and the second surface seal having a seal between the slot and the outer periphery; and
    the first surface seal of the sealing plate being slidably engaged to the rack plate, and the second surface of the sealing plate being slidably engaged to an inner surface of the first steering housing portion, whereby the seals prevent debris from entering the internal cavity and prevent lubricant from leaving the internal cavity of the steering housing.

11. The compact steering mechanism of claim 8, further comprising a rack carrier coupled to the steering pin, the steering pin securing the rack carrier to the rack such that it moves therewith.

12. The compact steering mechanism of claim 11 further comprising:
    at least one support member secured to the outside of the steering housing and extending generally parallel to the rack, the support member being engaged with the rack carrier, the rack carrier being slideable along the support member.

13. The compact steering mechanism of claim 12, wherein the support member comprises two parallel shafts secured at their ends to the housing, the rack carrier having channels to receive the shafts between the ends of the shafts.

14. The compact steering mechanism of claim 7, wherein guide members are coupled to the ends of the rack, said guide members interfacing with the interior of the steering housing for guiding the rack as it moves laterally within the housing.

15. A light-weight compact steering mechanism for steering right and left front ground engaging members coupled to a chassis of a vehicle with at least one tie rod, the mechanism comprising:
    a pinion shaft coupled to a pinion, the pinion having a center axis;
    a rack having two opposing ends and having teeth meshing with the pinion between the opposing ends, the rack movable relative to the pinion and relative to the chassis upon rotation of the pinion;
    an output member coupled to the rack to move therewith and positioned between the ends of the rack, and wherein the output member is couplable to the tie rod of the vehicle; and
    a rack carrier spatially separated from the rack, the rack carrier slidably coupled to a chassis and structurally supported by the chassis of the vehicle, wherein the rack is thereby structurally supported by the rack carrier, thereby reducing the weight and length of the compact steering mechanism.

16. The compact steering mechanism of claim 15, further comprising:
    a steering housing having a first housing portion and a second housing portion secured to one another by a plurality of fasteners;
    an opening disposed in the central portion of the second housing portion for receiving the pinion shaft, the pinion shaft coupled to the steering wheel of the vehicle; and
    the second and first steering housing portions providing an internal cavity containing the rack, the pinion, a portion of the output member, and a sealing plate slidably coupled between the rack and the housing.

17. The compact steering mechanism of claim 16, wherein the output member is a steering pin having a first end coupled to the rack and a second opposing end extending through slots in each of the sealing plate and the first housing portion.

18. The compact steering mechanism of claim 17, further comprising a rack plate wherein:
    the rack plate is between the rack and the sealing plate, the rack plate having a hole receiving the second end of the steering pin;
    the sealing plate having an outer periphery, a first surface seal, and an opposing second surface seal, the sealing plate having a slot through which the steering pin extends, the first surface seal having a seal secured adjacent the slot and the second surface seal having a seal between the slot and the outer periphery; and the first surface seal of the sealing plate being slidably engaged to the rack plate, and the second surface of the sealing plate being slidably engaged to an inner surface of the first steering housing portion, whereby the seals prevent debris from entering the internal cavity and prevent lubricant from leaving the internal cavity of the steering housing.

19. The compact steering mechanism of claim 16, wherein guide members are coupled to the ends of the rack, said guide members interfacing with the interior of the steering housing for guiding the rack as it moves laterally within the housing.

20. The compact steering mechanism of claim 15, wherein the rack carrier is coupled to the output member, the output member securing the rack carrier to the rack such that it moves therewith.

21. The compact steering mechanism of claim 20 further comprising:
   a housing enclosing the rack and pinion; and
   at least one support member secured to the outside of the housing and extending generally parallel to the rack, the support member being engaged with the rack carrier, the rack carrier being slideable along the support member.

22. The compact steering mechanism of claim 21, wherein the support member comprises two parallel shafts secured at their ends to the housing, the rack carrier having channels to receive the shafts between the ends of the shafts.

23. The compact steering mechanism of claim 15, further comprising:
   the output member being a first gear member;
   the first gear member pivotally coupled to the steering housing;
   teeth formed on a first end of the gear member, the teeth meshing with the teeth of the rack; and
   a second end of the gear member coupled to the tie rod of the vehicle.

24. The compact steering mechanism of claim 23 further comprising a second output member being a second gear member having a first and a second end, the second gear member having teeth formed on the first end meshing with the teeth of the rack, and wherein the at least one tie rod comprises left and right tie rods and wherein the second end of the first gear member is coupled to the left tie rod and the second end of the second gear member is coupled to the right tie rod of the vehicle.

25. The compact steering mechanism of claim 24, wherein a stabilizing link pivotally couples the first and second gear members.

26. The compact steering mechanism of claim 15, further comprising:
   a first gear coupled to the pinion shaft, the first gear having a center and the pinion shaft coupled at an off-center portion of the first gear;
   a second gear coupled to a steering shaft, the second gear having a center and the steering shaft coupled at an off-center portion of the second gear, the center axis of the steering shaft being parallel to the center axis of the pinion shaft; and
   wherein the first and second gears mesh, whereby rotating the steering shaft causes rotation of the first gear causing rotation of the second gear, which therefore causes variable rotational speed of the pinion shaft and the pinion, thereby causing lateral movement of the rack and the output member in a speed that varies with the input rotational speed of the steering shaft, thereby providing variable output rotational speed for rapid steering output or slow steering output relative to the input rotational speed and the position of the gears relative to one another.

27. The compact steering mechanism of claim 26, wherein the output member is a flange secured to the rack at a surface opposite the surface of the teeth of the rack, wherein the flange includes two holes for coupling to left and right tie rods of the vehicle, the flange and holes positioned between the ends of the rack.

28. The compact steering mechanism of claim 26, wherein a rack guide is coupled to the steering housing and the rack for guiding the rack as it moves laterally, the rack guide includes a hole containing the pinion and two bearings, each bearing secured to the hole and each bearing coupled to the pinion shaft for allowing rotation of the pinion and pinion shaft.

29. A method of steering a vehicle having a compact steering mechanism coupled to a steering wheel and to a pair of tie rod assemblies coupled to wheels of the vehicle, the method comprising:
   providing a compact steering mechanism, the mechanism comprising:
      a pinion shaft coupled to a pinion;
      a rack having teeth meshing with the pinion;
      an output member coupled to the rack;
      a rack carrier coupled to the output member, wherein the output member securing the rack carrier to the rack such that it moves therewith, and wherein the rack carrier is couplable to the pair of tie rod assemblies of the vehicle; and
      at least one support member engaged to the rack carrier and extending generally parallel to the rack, the rack carrier being slideable along the support member;
   rotating the pinion shaft and the pinion in a desired speed and direction;
   engaging the teeth of the pinion to the teeth of the rack, thereby moving the rack in a lateral direction relative to the desired speed and direction of the rotation of the pinion shaft;
   moving the output member and the rack carrier cooperatively with movement of the rack, whereby the rack carrier slides along the at least one support member, thereby moving the left and right tie rods and wheels of the vehicle relative to the desired speed and direction.

30. The method of claim 29, wherein:
   the steering housing comprises a first housing portion and a second housing portion secured to one another by a plurality of fasteners;
   an opening is disposed in the central portion of the first housing portion for receiving the pinion shaft coupled to the steering wheel of the vehicle; and
   the first and second steering housings thereby comprising an internal cavity containing the rack, the pinion, a rack plate, and a sealing plate.

31. The method of claim 30, wherein the output member is a steering pin, wherein the steering pin extends through a hole formed between ends of the rack, and wherein the second end of the steering pin extends through slots in each of the rack plate, the sealing plate, and the second housing portion.

32. The method of claim 31 further comprising the step of moving a rack carrier cooperatively with the rack, wherein the rack carrier is coupled to the steering pin.

33. The method of claim 32 further comprising:
   sliding the rack carrier along a support shaft, wherein the central axis of the support shaft is substantially parallel to a lateral axis of the rack; and
   securing the support shaft to the steering housing, whereby the support shaft guides the rack carrier as it moves in the axial direction and the support shaft is secured to the steering housing portions and to the chassis of the vehicle.

34. The method of claim 30 further comprising:
engaging the rack plate to a lateral surface of the rack;
providing the sealing plate having a first surface and an opposing second surface, the first surface having a seal secured to the inner portion of the first surface and the second surface having a seal secured to the outer portion of the second surface; and
sealing the steering housing by engaging the first surface of the sealing plate to the rack plate and by engaging the second surface of the sealing plate to the inner surface of the second steering housing portion.

35. The method of claim 30 further comprising guiding the rack in the steering housing by guide members coupled to the ends of the rack as the rack moves in the lateral direction within the steering housing.

36. The method of claim 29 further comprising the steps of:
providing the output member being a first gear member, the first gear member pivotally coupled to a shaft coupled to the steering housing, wherein teeth formed on the first end of the gear member mesh with the teeth of the rack;
providing the second end of the gear member coupled to tie rods of the vehicle; and
rotating the gear member about a center axis, thereby moving the left and right tie rods and wheels of the vehicle in the desired direction.

37. The method of claim 36, further comprising the steps of:
providing a second output member being a second gear having a first and second end, the second gear member having teeth formed on the first end meshing with the teeth of the rack, and wherein the second ends of the first and second gear members are coupled to the left and right tie rods of the vehicle; and
rotating the gear members about a center axes, thereby moving the left and right tie rods and wheels of the vehicle in the desired direction.

38. The method of claim 29, further comprising the steps of:
providing a first gear coupled to the pinion shaft, the first gear having a center and the pinion shaft coupled at an off-center portion of the first gear;
rotating a steering shaft in a desired direction, the steering shaft coupled to a second gear, wherein the second gear has a center and the steering shaft is coupled at an off-center portion of the second gear, and wherein the second gear meshes with the first gear, whereby rotating the steering shaft causes rotation of the second gear causing rotation of the first gear, which therefore causes variable rotational speed of the pinion shaft and the pinion, thereby causing lateral movement of the rack and the output member in a speed faster or slower than the input rotational speed of the steering shaft, thereby providing variable output rotational speed for rapid steering output or slow steering output relative to the input rotational speed and the position of the gears relative to each other.

39. The method of claim 38, wherein the output member is a flange secured to the rack, the flange having two opposing holes coupled to tie rods of the vehicle, the flange and holes positioned between the ends of the rack.

40. The method of claim 38 further comprises the step of guiding the rack in a rack guide as the rack moves laterally, the rack guide including a hole containing the pinion shaft and pinion and two bearings, each bearing coupled to opposing ends of the pinion shaft for allowing rotation of the pinion and pinion shaft.

41. A light-weight compact steering mechanism for steering right and left front ground engaging members of a vehicle with at least one tie rod, the mechanism comprising:
a pinion shaft coupled to a pinion, the pinion having a center axis;
a rack having two opposing ends and having teeth meshing with the pinion between the opposing ends;
an output member coupled to the rack and positioned between the ends of the rack, and wherein the output member is couplable to the tie rod of the vehicle;
a rack carrier slidably coupled to a chassis and structurally supported by the chassis of the vehicle, wherein the rack is thereby structurally supported by the rack carrier, thereby reducing the weight and length of the compact steering mechanism;
a steering housing having a first housing portion and a second housing portion secured to one another by a plurality of fasteners;
an opening disposed in the central portion of the second housing portion for receiving the pinion shaft, the pinion shaft coupled to the steering wheel of the vehicle; and
the second and first steering housing portions providing an internal cavity containing the rack, the pinion, a portion of the output member, and a sealing plate slidably coupled between the rack and the housing.

\* \* \* \* \*